United States Patent
Chopra et al.

(10) Patent No.: US 11,323,627 B2
(45) Date of Patent: May 3, 2022

(54) METHOD AND ELECTRONIC DEVICE FOR APPLYING BEAUTY EFFECT SETTING

(71) Applicant: Samsung Electronics Co., Ltd., Suwon-si (KR)

(72) Inventors: Ashish Chopra, Noida (IN); Rajan Dahiya, Noida (IN); Vivek Kumar Kohli, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 17/012,668

(22) Filed: Sep. 4, 2020

(65) Prior Publication Data
US 2021/0084232 A1   Mar. 18, 2021

(30) Foreign Application Priority Data
Sep. 12, 2019   (IN) .............................. 201941036765

(51) Int. Cl.
*G06T 11/60* (2006.01)
*G06T 7/00* (2017.01)
(Continued)

(52) U.S. Cl.
CPC ......... *H04N 5/232935* (2018.08); *G06T 3/40* (2013.01); *G06T 7/0002* (2013.01);
(Continued)

(58) Field of Classification Search
CPC ........... G06K 9/00268; G06K 9/00248; G06K 9/00281
See application file for complete search history.

(56) References Cited

U.S. PATENT DOCUMENTS 8,997,757 B1 * 4/2015 Soare .................... A45D 26/00
                                                     132/200
9,652,661 B2   5/2017 Tang et al.
(Continued)

FOREIGN PATENT DOCUMENTS

KR   10-2017-0134256 A   12/2017

OTHER PUBLICATIONS

Roy H, Dhar S, Dey K, Acharjee S, Ghosh D. An automatic face attractiveness improvement using the golden ratio. InAdvanced Computational and Communication Paradigms 2018 (pp. 755-763). Springer, Singapore. (Year: 2018).*
(Continued)

*Primary Examiner* — Clifford Hilaire
(74) *Attorney, Agent, or Firm* — Jefferson IP Law, LLP

(57) ABSTRACT

A method for applying a beauty effect setting in an electronic device is provided. The method includes detecting, by the electronic device, user face from a current previewed frame in a viewfinder of a camera. Further, the method includes extracting, by the electronic device, a plurality of feature points from the detected user face. Further, the method includes determining, by the electronic device, at least one beauty ratio based on the plurality of extracted feature points. Further, the method includes superimposing, by the electronic device, the at least one beauty ratio with a predefined beauty ratio. Further, the method includes mapping, by the electronic device, the at least one superimposed beauty ratio to at least one camera beauty effect. Further, the method includes applying, by the electronic device, the beauty effect setting on the user face based on the at least one mapped camera beauty effect.

18 Claims, 29 Drawing Sheets

(51) Int. Cl.
    *G06T 3/40*     (2006.01)
    *G06V 40/16*     (2022.01)
    *H04N 5/232*     (2006.01)

(52) U.S. Cl.
    CPC ............ *G06T 11/60* (2013.01); *G06V 40/165* (2022.01); *G06V 40/168* (2022.01); *G06T 2207/20084* (2013.01); *G06T 2207/30201* (2013.01)

(56) References Cited

U.S. PATENT DOCUMENTS

| | | | |
|---|---|---|---|
| 10,303,933 | B2 | 5/2019 | Lee et al. |
| 10,446,052 | B2 | 10/2019 | Shen et al. |
| 10,479,109 | B2 | 11/2019 | Wong et al. |
| 2006/0104504 | A1* | 5/2006 | Sung ............... G06K 9/00281 382/159 |
| 2011/0135205 | A1* | 6/2011 | Rhee .................. G06T 7/60 382/195 |
| 2016/0125229 | A1* | 5/2016 | Soare .............. G06T 11/60 382/118 |
| 2017/0076474 | A1* | 3/2017 | Fu .................... G06K 9/00268 |
| 2018/0032797 | A1 | 2/2018 | Lee et al. |
| 2018/0077347 | A1 | 3/2018 | Tanaka |
| 2018/0286057 | A1* | 10/2018 | Hayduke ............... G06T 11/60 |
| 2018/0359411 | A1* | 12/2018 | Kohstall ............ H04N 5/23222 |
| 2019/0130538 | A1 | 5/2019 | Zeng |
| 2019/0206031 | A1 | 7/2019 | Kim et al. |
| 2019/0244408 | A1 | 8/2019 | Nishi et al. |
| 2019/0269224 | A1 | 9/2019 | Fu et al. |

OTHER PUBLICATIONS

Chen F, Xiao X, Zhang D. Data-driven facial beauty analysis: prediction, retrieval and manipulation. IEEE Transactions on Affective Computing. Aug. 11, 2016;9(2):205-16. (Year: 2018).*

X. Liang, S. Tong, T. Kumada and S. Iwaki, "Golden Ratio: The Attributes of Facial Attractiveness Learned By CNN," 2019 IEEE International Conference on Image Processing (ICIP), 2019, pp. 2124-2128, doi: 10.1109/ICIP.2019.8803166. (Year: 2019).*

Fan YY, Liu S, Li B, Guo Z, Samal A, Wan J, Li SZ. Label distribution-based facial attractiveness computation by deep residual learning. IEEE Transactions on Multimedia. Dec. 6, 2017;20(8):2196-208. (Year: 2017).*

Bottino A, Laurentini A. The analysis of facial beauty: an emerging area of research in pattern analysis. InInternational Conference Image Analysis and Recognition Jun. 21, 2010 (pp. 425-435). Springer, Berlin, Heidelberg. (Year: 2010).*

Woo J, Kim YJ, Kim S, Choe W. Visual cubism. In2015 International Symposium on Consumer Electronics (ISCE) Jun. 24, 2015 (pp. 1-2). IEEE. (Year: 2015).*

International Search Report dated Dec. 3, 2020, issued in International Patent Application No. PCT/KR2020/011938.

* cited by examiner

FIG. 7B

Match horizantal Ratio
- *Eyes – The inside and outside corners of the eyes
- *Nose – The width of the nose
- *Eyebrown – The inside edge of the eye brown Phi is the Greek letter ∅ used to represent 1.618, the beauty Ratio:
- 38 = Phi to the −2 power (e.g. $1/\phi^2$)
- 62 = Phi to the −1 power (e.g., $1/\phi$ or 0.618 multiplied by 100)
- 100 = Phi to the 0 power
- 162 = Phi to the 1 power (e.g., $\phi$ or 1.618 multiplied by 100)
- 200 = 162 + 38
- 224 = 162 + 62
- 262 = Phi to the 2 power (e.g., $\phi^2$ or 2.618 multiplied by 100)

Match vertical ratio
- *Nose – The base of the nose in relation to the distance from the pupils to the chin
- *Lips – The center of the lip line in relation to the distance from the pupils to the chin

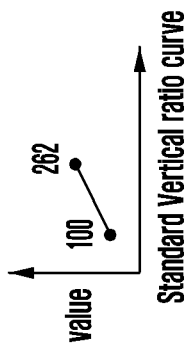

Standard Vertical ratio curve

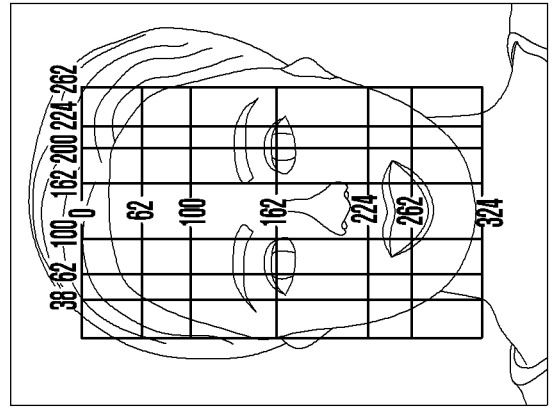

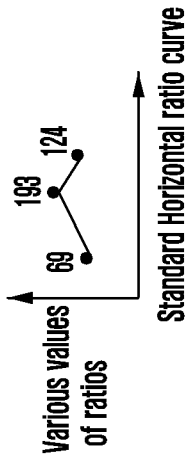

Standard Horizontal ratio curve

| Dimension | Beauty Ratio |
|---|---|
| Position of left pupil 38 pixels/ Beauty ratio line at 100 pixels | (38+100)/2 = 69 |
| Position of right pupil at 162 pixels/ Beauty ratio line at 224 pixels | (162+224)/2 = 193 |
| Distance between the pupils | 193−69 = 124 |
| Standard Horizontal ratio | 124/262 = 0.47 |

| Dimension | Beauty Ratio |
|---|---|
| Position the eyes at 162 pixels | (38+100)/2 = 69 |
| Position of the lips / teeth at 262 pixels | (162+224)/2 = 193 |
| Distance between the teeth and the chin | 262−162=100 |
| Height of the hairline at 62 pixels to the chin at 324 | 324−62=262 |
| Standard Vertical ratio | 100/262 = 0.38 |

Super-impose current beauty curve to half as 2 ratio's lie on curve, so to avoid cost take average moment

FIG. 10C

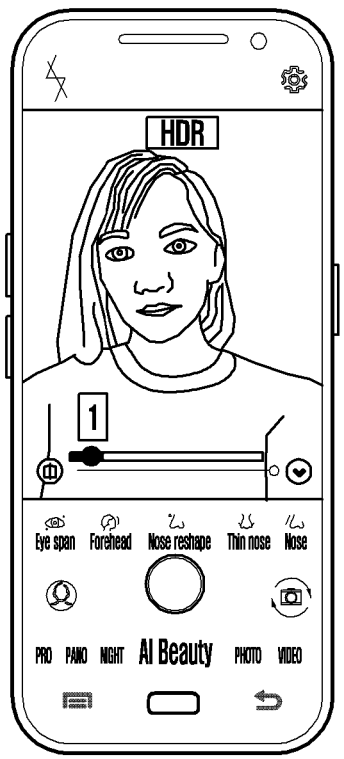

Forehead which allows user to change shape of forehead

Map table

| Standard Beauty Ratio mapped to "Forehead" mode |
|---|
| ① (2:4) Vertical distance between pupils and tip of the chin to vertical distance between top of the face and pupils |
| ② (3:5) is ratio of Vertical distance between top of the face and nose to vertical distance between nostrils and tip of the chin |

Proposed method predicted value. Example k = 1
Defalut view

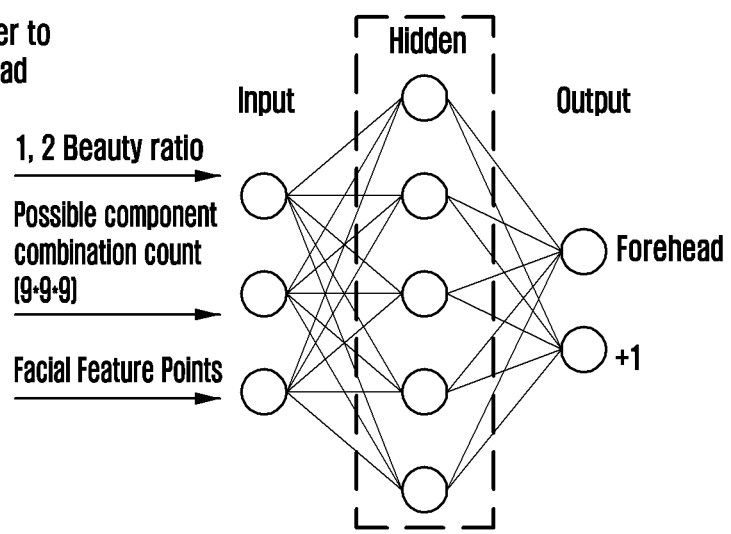

FIG. 10D

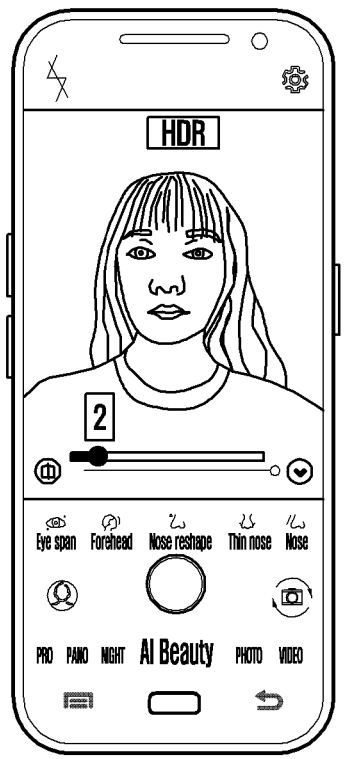

"Jaw" which allows user to
change shape of jaw for user

Map table

| Standard Beauty Ratio mapped to "jaw" mode |
|---|
| (6:7) is ratio of Vertical distance between pupils and central lip line to vertical distance between lips and tip of the chin |
| (8:9) is ratio of Vertical distance between pupils and nostrils to vertical distance between nostrils and central lip line |
| (7:9) is ratio of Vertical distance between lips and tip of the chin to viertical distance between nostrils and central lip line |

Proposed method predicted value. Example k = 2
Defalut view

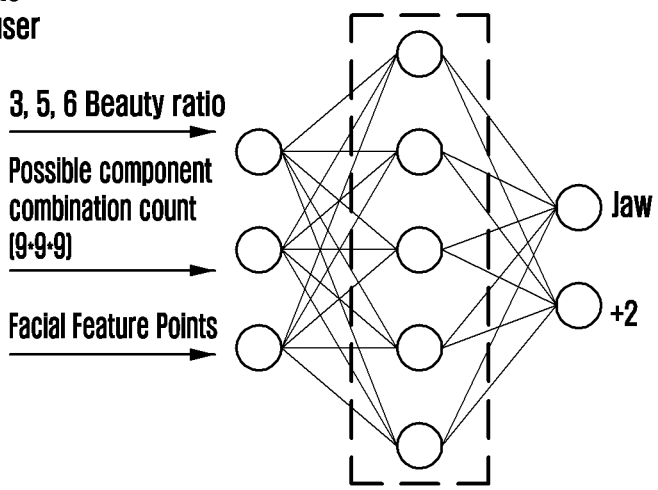

Thin nose which allows user
to change thinning of nose

| Standard Beauty Ratio mapped to Thin nose mode |
| Ratio of Smile width to nose width - 1.619 |
| Ratio of Nose width to inner edge of nostril - 1.624 |

Proposed method predicted value. Example k = 2
Defalut view

METHOD AND ELECTRONIC DEVICE FOR APPLYING BEAUTY EFFECT SETTING

CROSS-REFERENCE TO RELATED APPLICATION(S)

This application is based on and claims priority under 35 U.S.C. § 119(a) of an Indian patent application number 201941036765, filed on Sep. 12, 2019, in the Indian Patent Office, the disclosure of which is incorporated by reference herein in its entirety.

BACKGROUND

1. Field

The disclosure relates to a beauty effect recommendation system. More particularly, the disclosure relates to a method and electronic device for applying a beauty effect setting.

2. Description of Related Art

In general, a camera system can be used to recommend and take perfect pictures with appropriate beauty features adjusted according to ethnicity. While capturing the picture, an image processing is used to identify faces and machine learning is used to predict beauty setting effects. Based on the predicted beauty setting effects, manual changes are required to predict the beauty values of the face, which is just an editor effect. This results in reducing the user experience. In the existing methods, the beauty effect is provided based on a gender recognition, a face width, face height, eye width, eye height, jaw width, and jaw height. In other existing methods, the beauty effect is provided based on a person's age, gender and skin color.

Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and electronic device for applying a beauty effect setting.

Another aspect of the disclosure is to detect user face from a current previewed frame in a viewfinder of a camera.

Another aspect of the disclosure is to extract a plurality of feature points from the detected user face.

Another aspect of the disclosure is to determine at least one beauty ratio based on the plurality of extracted feature points.

Another aspect of the disclosure is to determine spatial data comprising at least one of a plurality of vertical distances from the plurality of extracted feature points and a plurality of horizontal distances from the plurality of extracted feature points.

Another aspect of the disclosure is to superimpose the at least one beauty ratio with a predefined beauty ratio.

Another aspect of the disclosure is to map the at least one superimposed beauty ratio to at least one camera beauty effect.

Another aspect of the disclosure is to apply the beauty effect setting on the user face based on the at least one mapped camera beauty effect.

Additional aspects will be set forth in part in the description which follows and, in part, will be apparent from the description, or may be learned by practice of the presented embodiments.

In accordance with an aspect of the disclosure, a method for applying a beauty effect setting in an electronic device is provided. The method includes detecting, by the electronic device, user face from a current previewed frame in a viewfinder of a camera. Further, the method includes extracting, by the electronic device, a plurality of feature points from the detected user face. Further, the method includes determining, by the electronic device, at least one beauty ratio based on the plurality of extracted feature points. Further, the method includes superimposing, by the electronic device, the at least one beauty ratio with a predefined beauty ratio. Further, the method includes mapping, by the electronic device, the at least one superimposed beauty ratio to at least one camera beauty effect. Further, the method includes applying, by the electronic device, the beauty effect setting on the user face based on the at least one mapped camera beauty effect.

In an embodiment, determining, by the electronic device, the at least one beauty ratio based on the plurality of extracted feature points includes determining spatial data comprising at least one of a plurality of vertical distances from the plurality of extracted feature points and a plurality of horizontal distances from the plurality of extracted feature points, and determining the beauty ratio based on the determined spatial data.

In an embodiment, the beauty ratio is at least one of a standard beauty ratio, a vertical beauty ratio, and a horizontal beauty ratio.

In an embodiment, superimposing the at least one beauty ratio with the predefined beauty ratio includes determining that maximum values associated with the at least one beauty ratio are deflecting with values associated with the predefined beauty ratio, and superimposing the at least one beauty ratio with the predefined beauty ratio based on the determination.

In an embodiment, superimposing the at least one beauty ratio with the predefined beauty ratio includes determining that minimum values associated with the at least one beauty ratio are deflecting with values associated with the predefined beauty ratio, mapping the at least one beauty ratio with the predefined beauty ratio based on at least one of an average distance of the minimum values associated with the at least one beauty ratio based on the determination, and superimposing the at least one beauty ratio with the predefined beauty ratio based on the mapping.

In an embodiment, superimposing the at least one beauty ratio with the predefined beauty ratio includes determining that minimum values associated with the at least one beauty ratio are deflecting with values associated with the predefined beauty ratio, mapping the at least one beauty ratio with the predefined beauty ratio based on at least one of an average distance of the minimum values associated with the at least one beauty ratio based on the determination, determining a distortion parameter using a neural network and superimposing the at least one beauty ratio with the predefined beauty ratio based on the mapping and the distortion parameter.

In accordance with another aspect of the disclosure, an electronic device for applying a beauty effect setting is provided. The electronic device includes a processor coupled with a memory. The processor is configured to detect user face from a current previewed frame in a viewfinder of a camera and extract a plurality of feature points from the detected user face. Further, the processor is configured to determine at least one beauty ratio based on the plurality of extracted feature points and superimpose the at least one beauty ratio with a predefined beauty ratio. Further, the processor is configured to map the at least one superimposed beauty ratio to at least one camera beauty effect and apply the beauty effect setting on the user face based on the at least one mapped camera beauty effect.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIGS. 7A and 7B are example scenarios in which an electronic device determines at least one beauty ratio based on a plurality of extracted feature points, according to various embodiments of the disclosure;

FIGS. 10A, 10B, 10C, 10D, and 10E are example scenarios in which an electronic device applies a beauty effect setting on a user face based on at least one mapped camera beauty effect, according to various embodiments of the disclosure.

Throughout the drawings, like reference numerals will be understood to refer to like parts, components, and structures.

DETAILED DESCRIPTION

Figure 1:
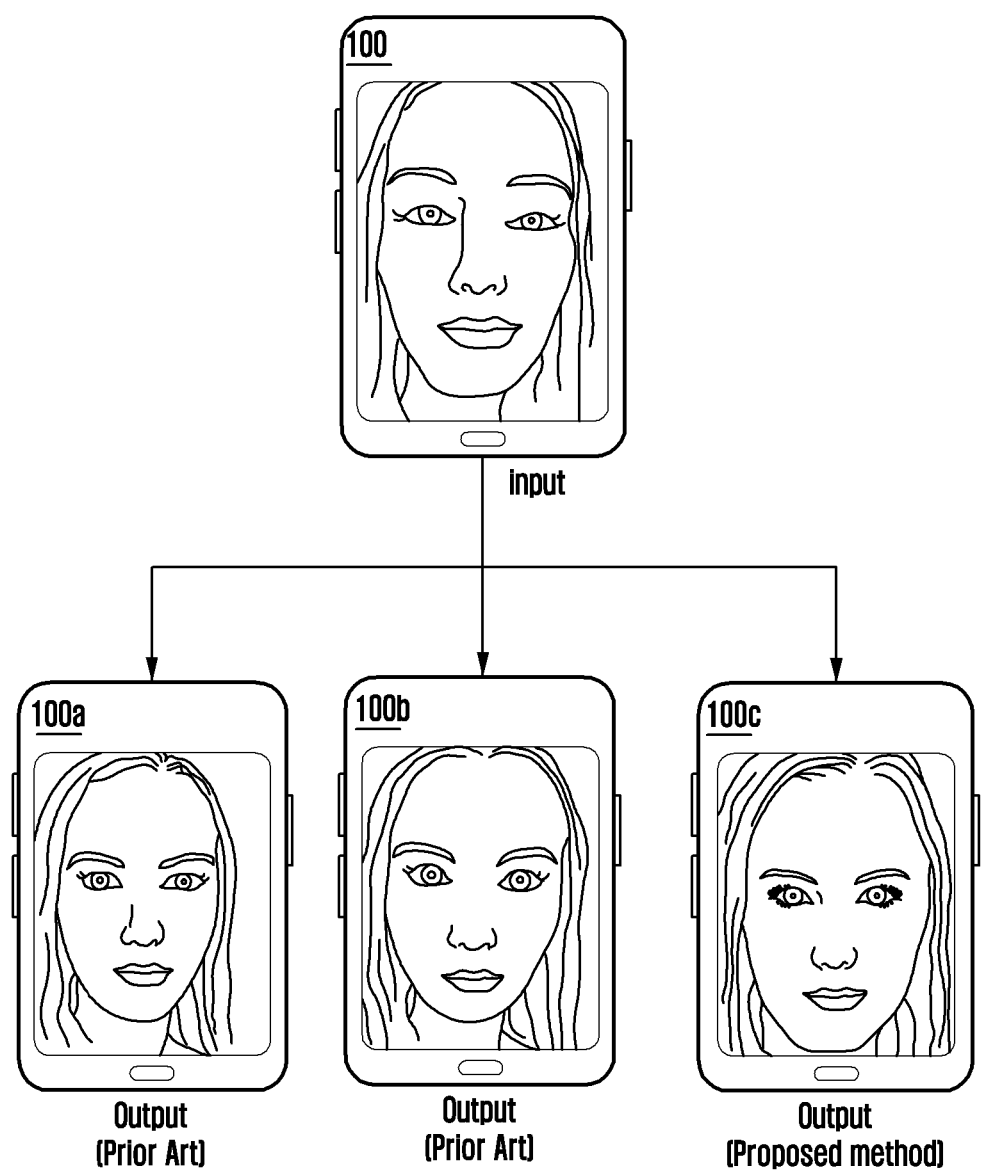
FIG. 1 illustrates an electronic device for applying a beauty effect setting according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein achieve a method for applying a beauty effect setting in an electronic device. The method includes detecting, by the electronic device, user face from a current previewed frame in a viewfinder of a camera. Further, the method includes extracting, by the electronic device, a plurality of feature points from the detected user face. Further, the method includes determining, by the electronic device, at least one beauty ratio based on the plurality of extracted feature points. Further, the method includes superimposing, by the electronic device, the at least one beauty ratio with a predefined beauty ratio. Further, the method includes mapping, by the electronic device, the at least one superimposed beauty ratio to at least one camera beauty effect. Further, the method includes applying, by the electronic device, the beauty effect setting on the user face based on the at least one mapped camera beauty effect.

Unlike methods and systems of the related art, the proposed method can be used to apply the beauty effect setting by a camera through machine learning (AI). The proposed method can be used to predict best beauty effects for user face by modifying structural changes in user facial features through the AI. The method can be used to provide incredible precision, accuracy, and faster AI generated image of the user face so that user photography experience is enhanced. Rather than providing brightness and skin smoothness, the method can be used to enhance structural quality of the user face, so as to reduce abnormalities in face structure. The method can be used to reduce user manual effort for applying the beauty effects.

Referring now to the drawings, and more particularly to FIGS. 1 to 4, 5A to 5F, 6, 7A, 7B, 8A to 8G, 9A, 9B, and 10A to 10E, there are shown preferred embodiments.

FIG. 1 illustrates an electronic device for applying a beauty effect setting according to an embodiment of the disclosure.

Referring to FIG. 1, an electronic device 100 can be, for example, but not limited to a cellular phone, a smart phone, a Personal Digital Assistant (PDA), a tablet computer, a laptop computer, a virtual reality device, a smart watch, an Internet of Things (IoT) and the like. The beauty effect setting can be, for example, but not limited to a large eye setting mode, a slim face setting mode, a shape correction setting mode, a nose reshape setting mode, a forehead setting mode, a jaw setting mode, a thin nose setting mode, and the like.

The electronic device 100 receives an input image and a beauty effect on the input image is provided based on various techniques.

Referring to an electronic device 100a, based on the existing methods, the beauty effect is provided based on a gender recognition, a face width, a face height, an eye width, an eye height, a jaw width, and jaw height. Referring to an electronic device 100b, based on the existing methods, the beauty effect is provided based on a person's age, a gender and a skin colour. Based on the proposed methods, as shown in an electronic device 100c is configured to detect user face from a current previewed frame in a viewfinder of a camera.

FIGS. 5A, 5B, 5C, 5D, 5E, and 5F are example scenarios in which an electronic device detects a user face from a current previewed frame in a viewfinder of a camera, according to various embodiments of the disclosure.

Figure 5A:
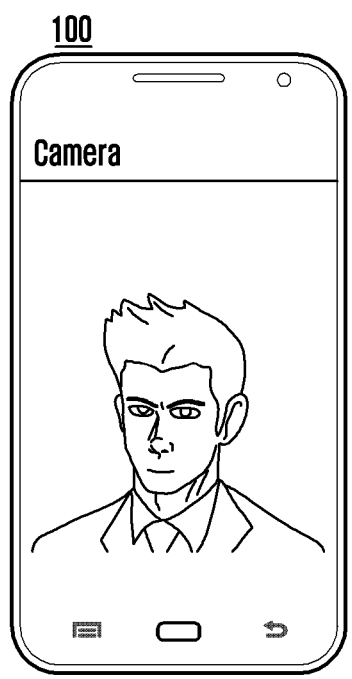
FIGS. 5A, 5B, 5C, 5D, 5E, and 5F are example scenarios in which an electronic device detects a user face from a current previewed frame in a viewfinder of a camera, according to various embodiments of the disclosure.
Figure 5B:
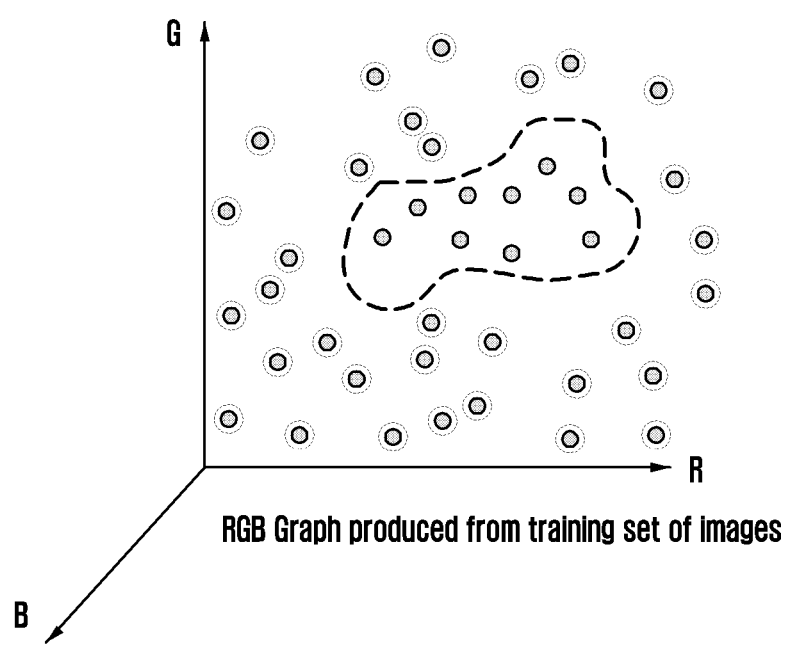
Figure 5C:
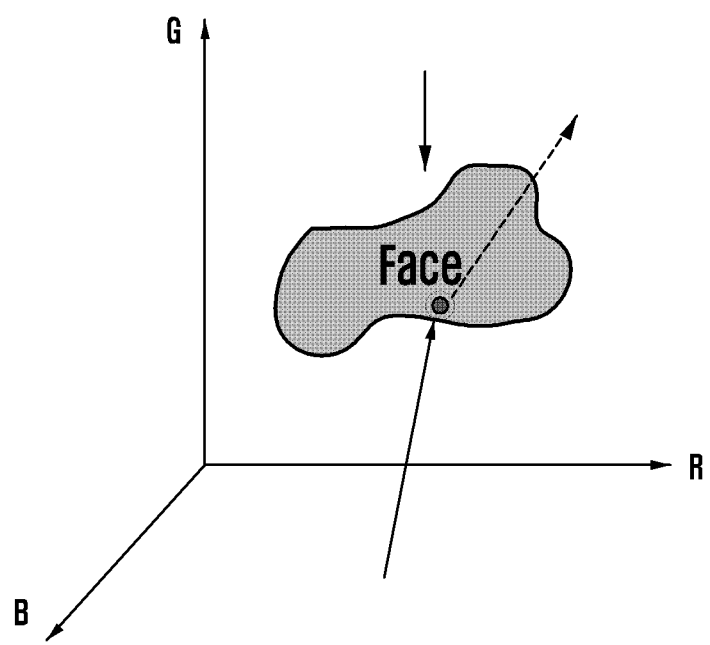

Referring to FIG. 5A the electronic device 100 receives an input image. Referring to FIG. 5B, the electronic device 100 generates a red green blue (RGB) graph from a trained set of images. In the graph, manually label face/non-face pixels in one or more training images and face pixels shown in orange, non-skin pixels shown in blue, some skin pixels may be outside the region and non-skin pixels inside the region in the RGB space. Referring to FIG. 5C, illustrates that face pixels have a distinctive range of colours that corresponds to region(s) in RGB colour space. Face classifier: A pixel X=(R,G,B) is face, if it is in the face (colour) region.

The equation below determines that it is face or not based on the probability distribution/density function (PDF).

Figure 5D:
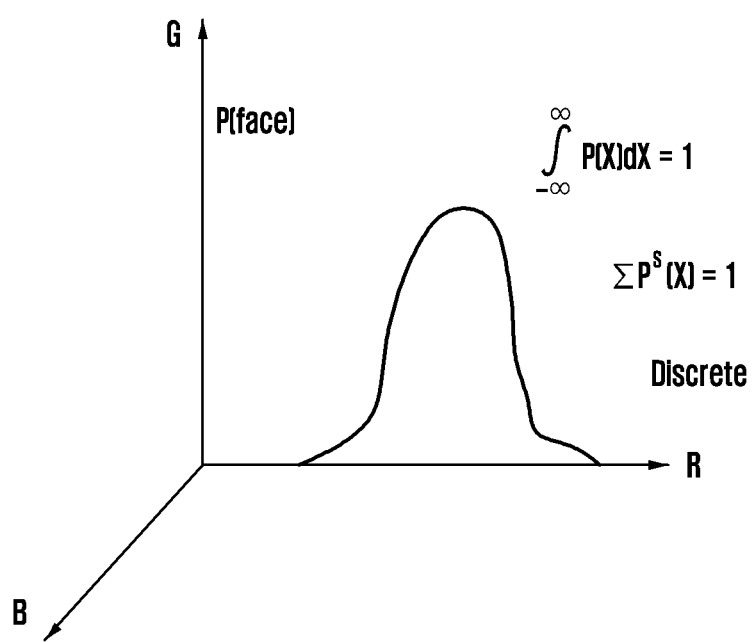

Referring to FIG. 5D, illustrates that P(X) is the probability that X achieves a certain value as shown in the Equation 1.

$$\int_{-\infty}^{\infty} P(X)dX = 1 \quad \text{continuous} \qquad \text{Equation 1}$$

Figure 5E:
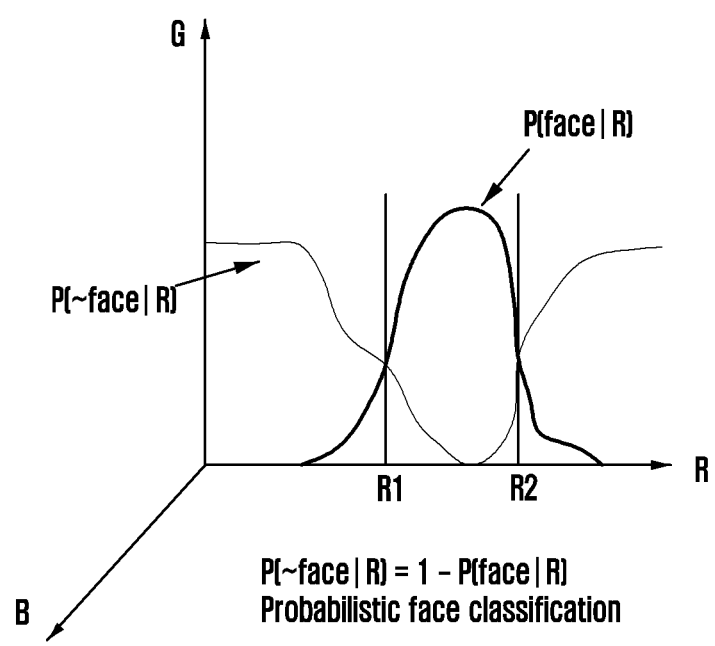
Figure 5F:
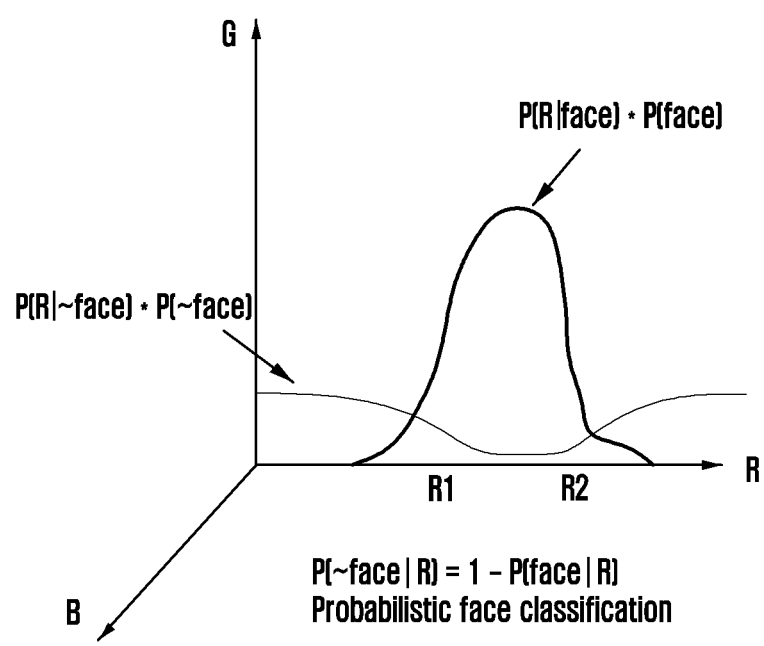

Referring to FIG. 5E, it indicates the probabilistic face classification function in which P(face): is proportion of face pixels in training set and P(face|R): what we want. Further, referring to FIG. 5F, it indicates the output of the face detection. The electronic device 100 can calculate P(R|skin) and P(face) is proportion of face from a set of training images from the Equation 2 to Equation 4, where P(face)= 0.75 and P(~face)=0.25

$$P(\text{face}/R) = \frac{P(R \mid \text{face}) * P(\text{face})}{P(R)} \qquad \text{Equation 2}$$

$$P(R \mid \text{face}) * P(\text{face}) + P(r \mid \sim\text{face}) * P(\sim\text{face}) \qquad \text{Equation 3}$$

$$P(R \mid \text{face}) = \frac{\text{\# face pixels with color } R}{\text{\# face pixels}} \qquad \text{Equation 4}$$

Based on the detected user face, the electronic device 100 is configured to extract a plurality of feature points.

Figure 6:
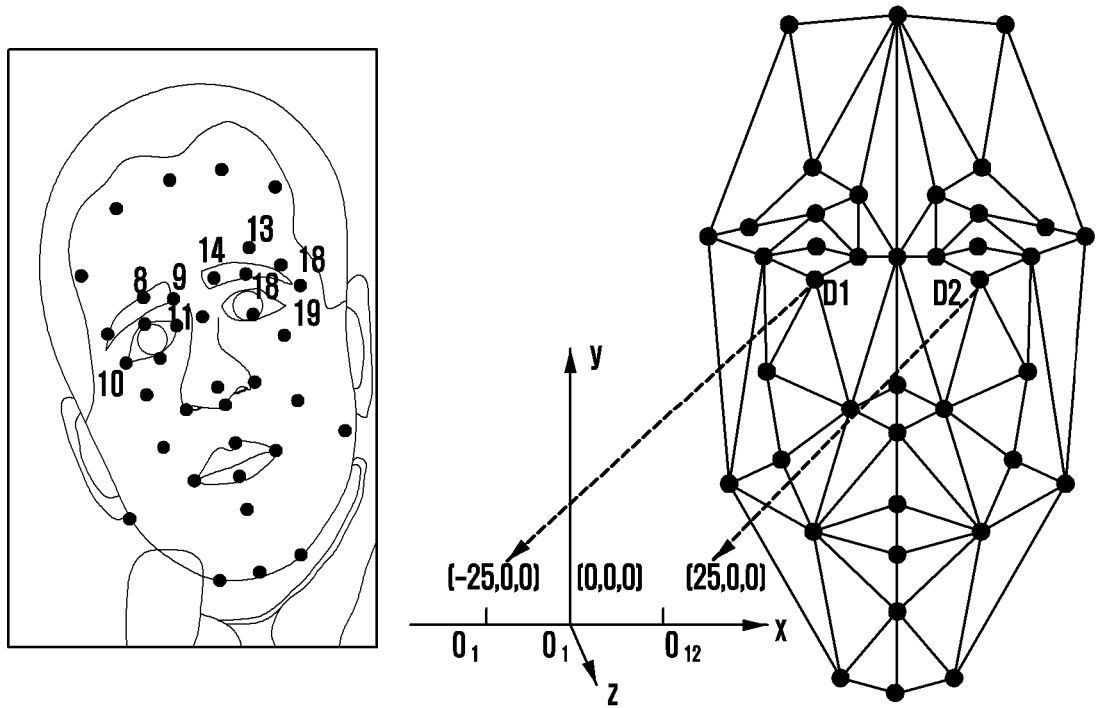
FIG. 6 is an example scenario in which an electronic device extracts a plurality of feature points from a user face, according to an embodiment of the disclosure.

FIG. 6 is an example scenario in which an electronic device extracts a plurality of feature points from a user face, according to an embodiment of the disclosure.

Referring to FIG. 6, it indicates that 3d model for face which has 40 feature points where each point have value in Point (x, y, z) planes. For feature extraction we have taken 5 frequencies and 8 different value of θ i.e. 40 feature points. Features 8, 9, 10, 11, 13, 14, 18 and 19 are enumerated as an example. The plurality of feature points are determined based on the Equation 5

$$fe^{\frac{x^2+y^2}{2\sigma^2}(\cos(2\pi fx+\phi)-\cos\phi e^{-2\pi^2\frac{\sigma^2}{f^2}}} \qquad \text{Equation 5}$$

where: σ=kf; f is frequency, x=x cos θ+y sin θ, y=−x sin θ+y cos θ

Figure 7A:
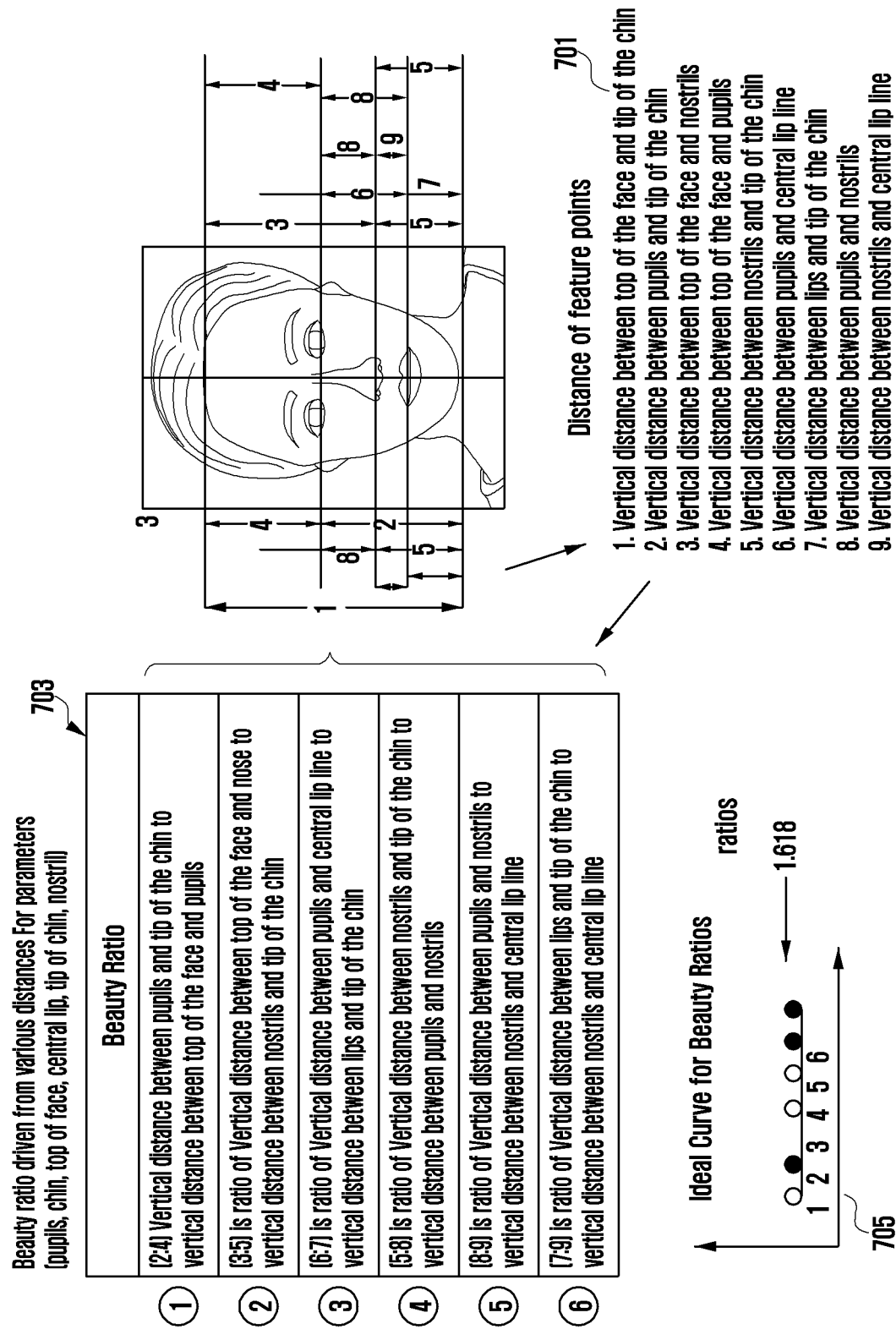

FIGS. 7A and 7B are example scenarios in which an electronic device determines at least one beauty ratio based on a plurality of extracted feature points, according to various embodiments of the disclosure.

Referring to FIG. 7A, the electronic device 100 is configured to determine at least one beauty ratio based on the plurality of extracted feature points. The at least one beauty ratio is determined by determining spatial data comprising at least one of a plurality of vertical distances from the plurality of extracted feature points and a plurality of horizontal distances from the plurality of extracted feature points. In an embodiment, the beauty ratio is at least one of a standard beauty ratio, a vertical beauty ratio, and a horizontal beauty ratio. In an example, the obtained 40 feature points are used to calculate the horizontal and vertical ratio along with beauty ratio. In an example, the beauty ratio is an irrational number, approximately 1.618, the vertical beauty ratio is 0.36, and the horizontal beauty ratio is 0.47. The beauty ratio are driven from various parameters (e.g., pupils, chin, top of face, central lip, tip of chin, nostril or the like). Element 701 of FIG. 7A indicates that vertical distance of various parameters. Element "703 of FIG. 7A indicates the beauty ratio table. Element 705 of FIG. 7A indicates an ideal curve for the beauty ratio.

Referring to FIG. 7B, it indicates the horizontal beauty ratio and a vertical beauty ratio along with ideal curve for the horizontal beauty ratio and the vertical beauty ratio. In an example, in FIG. 7B, table indicates that the beauty ratio is determined based on the various dimensions.

Further, the electronic device 100 is configured to superimpose the at least one beauty ratio with a predefined beauty ratio. In an example, the predefined beauty ratio is a standard beauty ratio which has taken as reference for the perfect face and contribute ratio value to 1.618 for 6 beauty components. Further, the electronic device 100 is configured to map the at least one superimposed beauty ratio to at least one camera beauty effect.

FIGS. 8A, 8B, 8C, 8DA, 8DB, 8EA, 8EB, 8F, and 8G are example scenarios in which an electronic device applies a beauty effect setting on a user face based on at least one mapped camera beauty effect, according to various embodiments of the disclosure.

Referring to FIGS. 8A, 8B, 8C, 8DA, 8DB, 8EA, 8EB, 8F, and 8G, in an embodiment, the at least one beauty ratio is superimposed with the predefined beauty ratio by determining that maximum values (i.e., at least three values from six values) associated with the at least one beauty ratio are deflecting with values associated with the predefined beauty ratio, and superimposing the at least one beauty ratio with the predefined beauty ratio based on the determination. The operations and functions of the superimposed process is explained in conjunction with FIGS. 8DA and 8DB.

In an embodiment, the at least one beauty ratio is superimposed with the predefined beauty ratio by determining that minimum values (i.e., two values from six values) associated with the at least one beauty ratio are deflecting with values associated with the predefined beauty ratio, mapping the at least one beauty ratio with the predefined beauty ratio based on at least one of an average distance of the minimum values associated with the at least one beauty ratio based on the determination, and superimposing the at least one beauty ratio with the predefined beauty ratio based on the mapping. The operations and functions of the superimposed process is explained in conjunction with FIG. 9A and FIG. 9B. The minimum values are changeable based on the at least one beauty ratio which is determined by an original equipment manufacturer (OEM level) or setting by the user. In an example, the standard beauty ratio has 9 values, in that case minimum value will be less than 4.

In an embodiment, the at least one beauty ratio is superimposed with the predefined beauty ratio by determining that minimum values (i.e., two values from six values) associated with the at least one beauty ratio are deflecting with values associated with the predefined beauty ratio, mapping the at least one beauty ratio with the predefined beauty ratio based on at least one of an average distance of the minimum values associated with the at least one beauty ratio based on the determination, determining the distortion parameter using a neural network and superimposing the at least one beauty ratio with the predefined beauty ratio based on the mapping and the distortion parameter. The operations and functions of the superimposed process is explained in conjunction with FIGS. 8F and 8G.

The superimposed process is considered first instead of using the neural network for applying the beauty effect setting on the user face. This results in reducing time for applying the beauty effect setting on the user face based on the at least one mapped camera beauty effect in a cost effective manner.

Further, the electronic device 100 is configured to apply the beauty effect setting on the user face based on the at least one mapped camera beauty effect. The beauty effect setting can be, for example, but not limited to, increasing or decreasing the facial width of the user as suitable for the user, increasing or decreasing distance between eye corners and enlarging eye pupils according to the user, and changing the facial distances like vertical and horizontal distances to make a perfect aligned face according to the user.

Figure 8A:
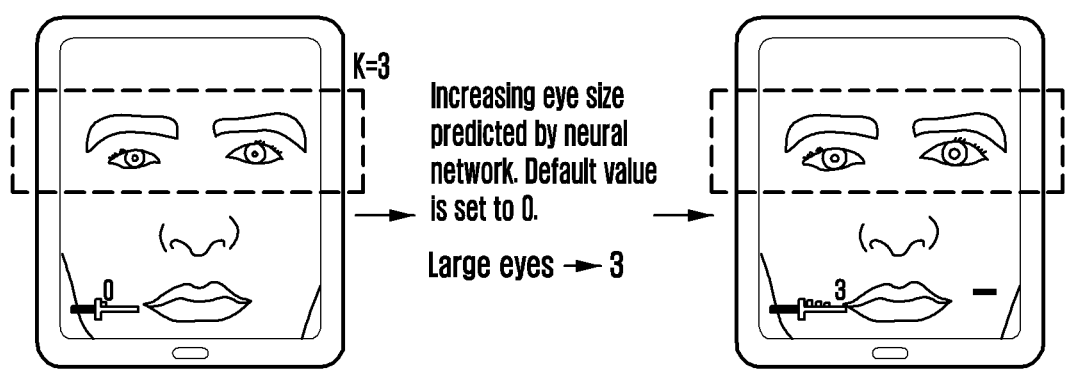
FIGS. 8A, 8B, 8C, 8DA, 8DB, 8EA, 8EB, 8F, and 8G are example scenarios in which an electronic device applies a beauty effect setting on a user face based on at least one mapped camera beauty effect, according to various embodiments of the disclosure.
Figure 8B:
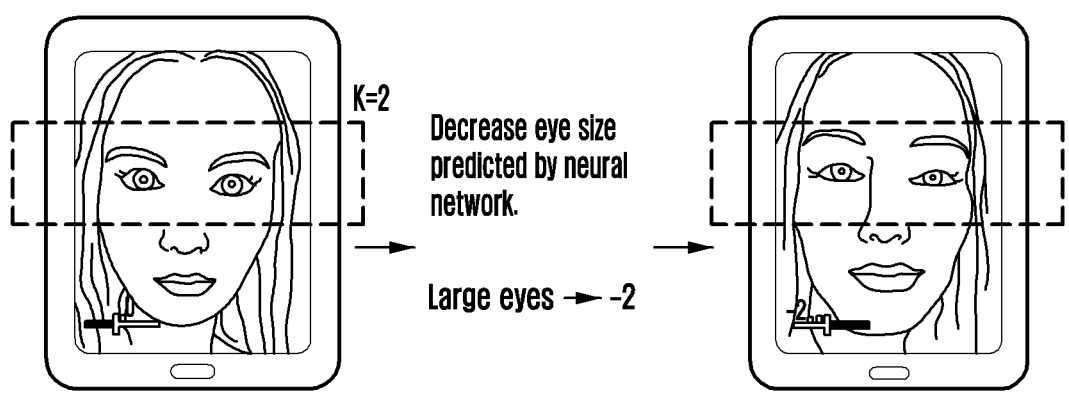

In an example, as shown in FIG. 8A, the electronic device 100 is configured to increase the eye size of the user as suitable for the user based on the beauty ratio. In another example, as shown in FIG. 8B, the electronic device 100 is configured to decrease the eye size of the user as suitable for the user based on the beauty ratio.

Figure 8C:
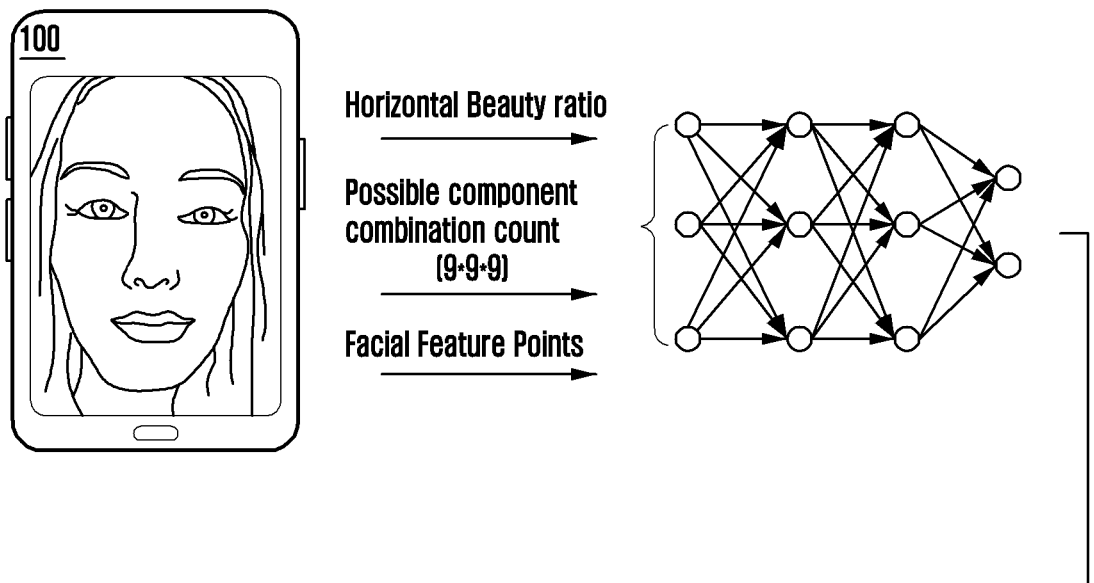
Figure 8C:
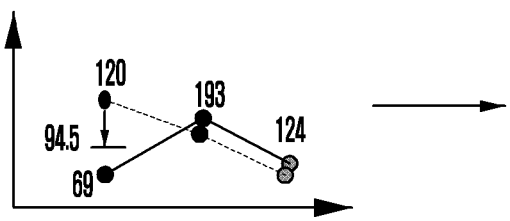
Figure 8C:
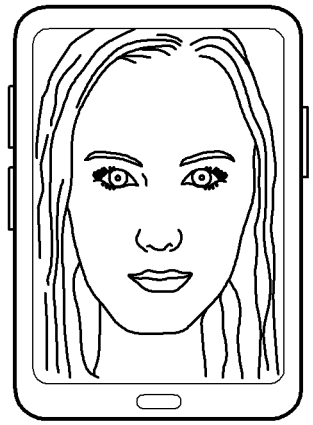

Referring to FIG. 8C, the electronic device 100 is configured to increase the eye size of the user as suitable for the user by determining the beauty ratio (K).

$$K=(\text{Number of beauty ratio lie on curve}*(\text{sum of differences in ratio's}))/(\text{Normalization factor})$$

where the sum of differences in ratio's=|120−94.5|+0+0=25.5, Normalization factor=100 constant, Number of beauty ratio lie on ideal horizontal curve=2

$$K=(2*25.5)/100=0.51 \rightarrow 1; \text{so value of } k \text{ is } 1.$$

This effect is mapped to the standard beauty ratio, so that the mapped standard beauty ratio is applied to large eyes. The super-impose current beauty curve to half as 2 ratio's lie on the predefined beauty curve, so to avoid cost take average moment.

Figure 8D:
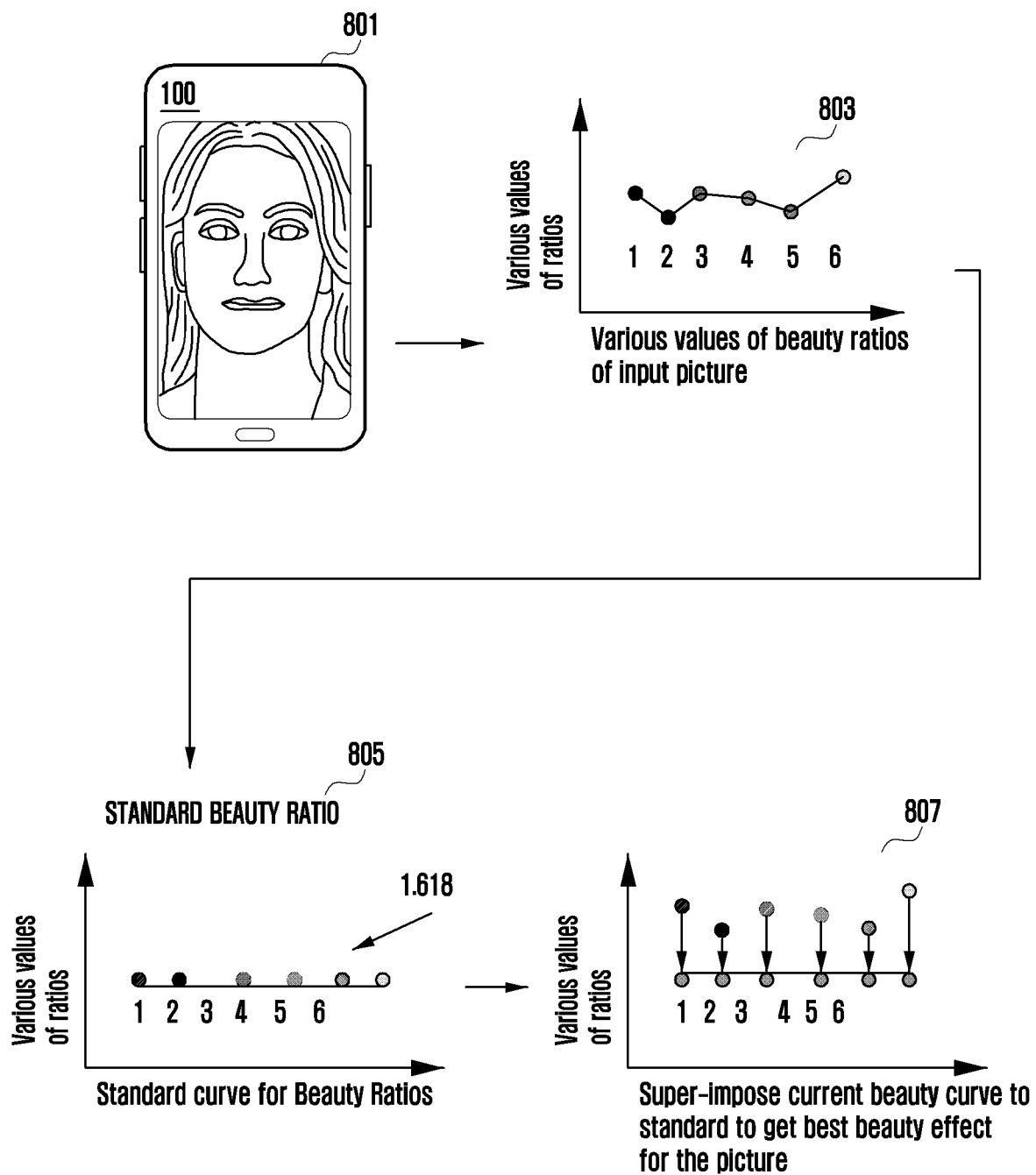
Figure 8D:
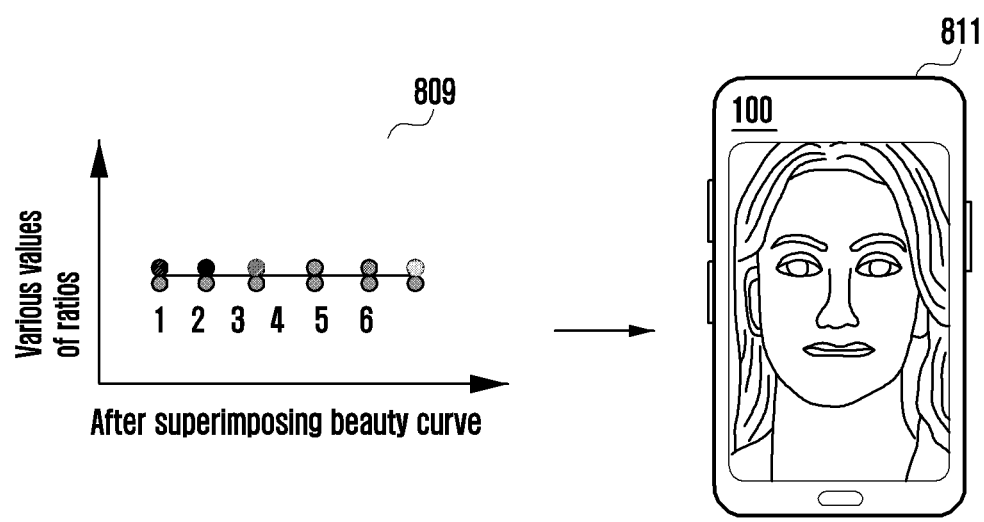

Referring to FIGS. 8DA, 8DB, 8EA and 8EB, based on the input pictures, various values of beauty ratios of the input picture is obtained and the standard curve for the beauty ratios is obtained. The super-impose current beauty curve to the standard curve to obtain best beauty effect for the picture. After superimposing beauty curve, the display 140 shows the final output. The super-impose current beauty curve applied to the standard curve to get best beauty effect for the picture. As, the electronic device 100 have 6 beauty components so standard beauty components should be in use.

The element 803 of FIG. 8DA indicates various values of beauty ratios of the input picture as shown in element 801 of FIG. 8DA. The element 805 of FIG. 8DA indicates the standard curve for the beauty ratios. The element 807 of FIG. 8DA indicates the super-impose current beauty curve to standard to obtain best beauty effect for the picture. The element 809 of FIG. 8DB indicates the beauty curve after superimposing. The element 811 of FIG. 8DB indicates the final output image.

Figure 8E:
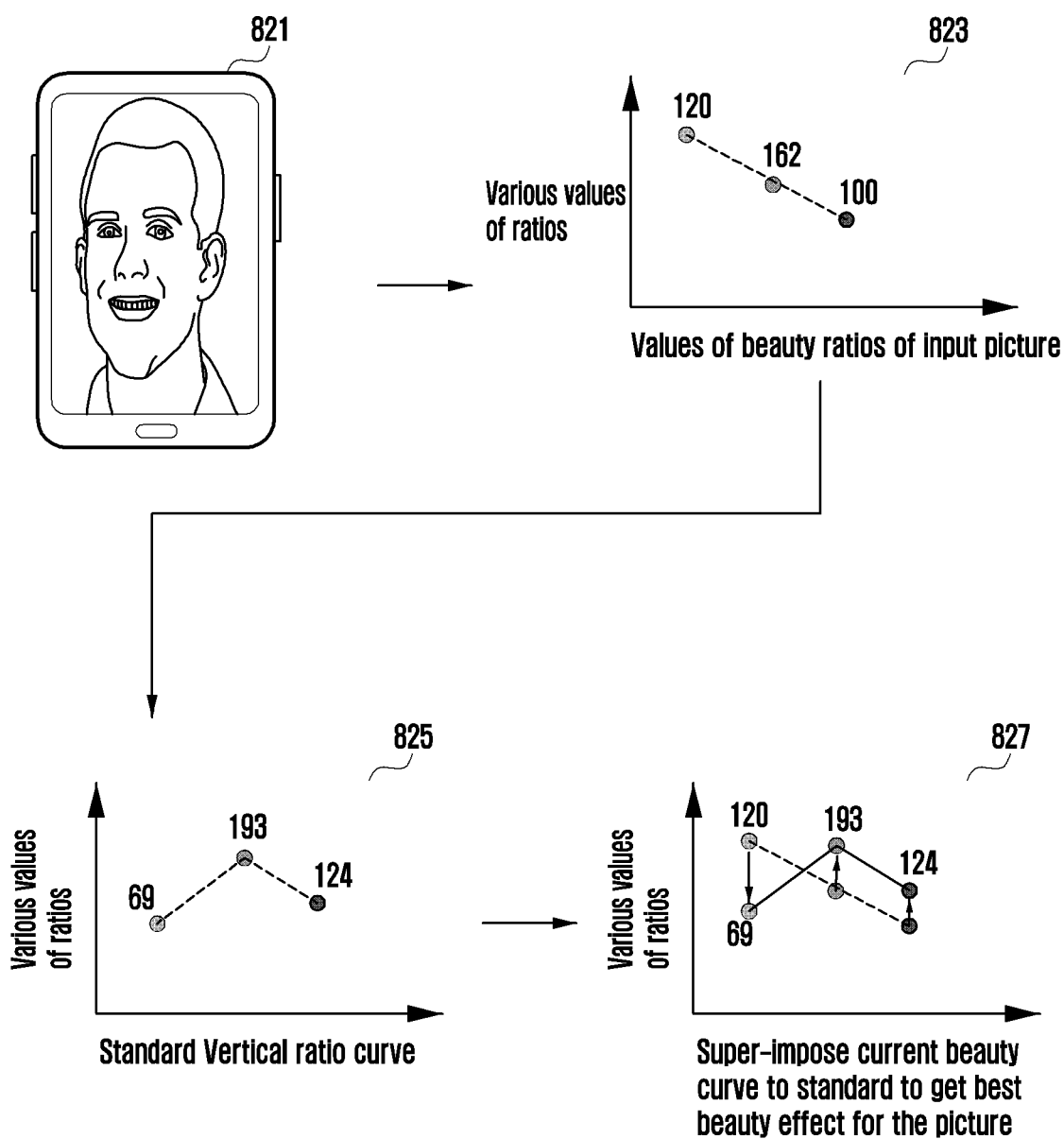
Figure 8E:
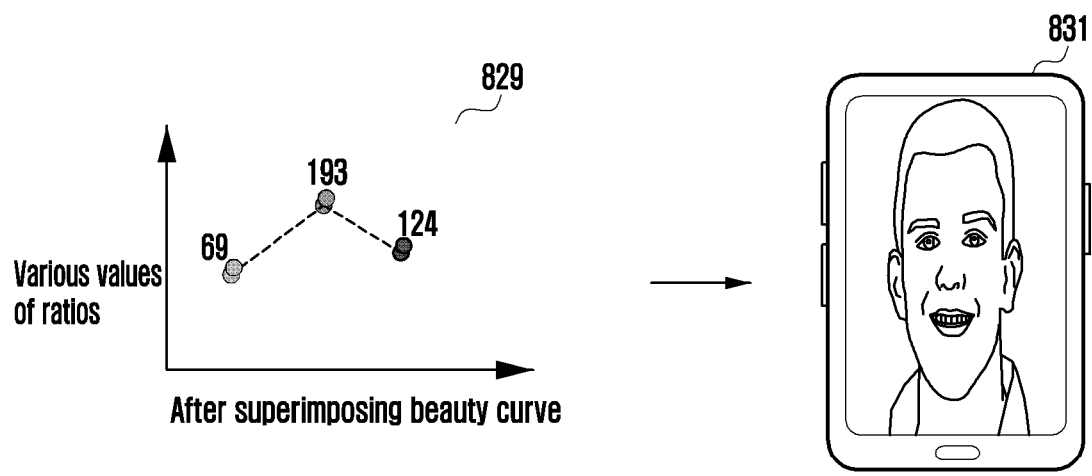

Similarly, the element 823 of FIG. 8EA indicates various values of beauty ratios of the input picture as shown in element 821 of FIG. 8EA. The element 825 of FIG. 8EA indicates the standard vertical ratio curve for the beauty ratios. The element 827 of FIG. 8EA indicates the super-impose current beauty curve to standard to obtain best beauty effect for the picture. The element 829 of FIG. 8EB indicates the beauty curve after superimposing. The element 831 of FIG. 8EB indicates the final output image.

Figure 8F:
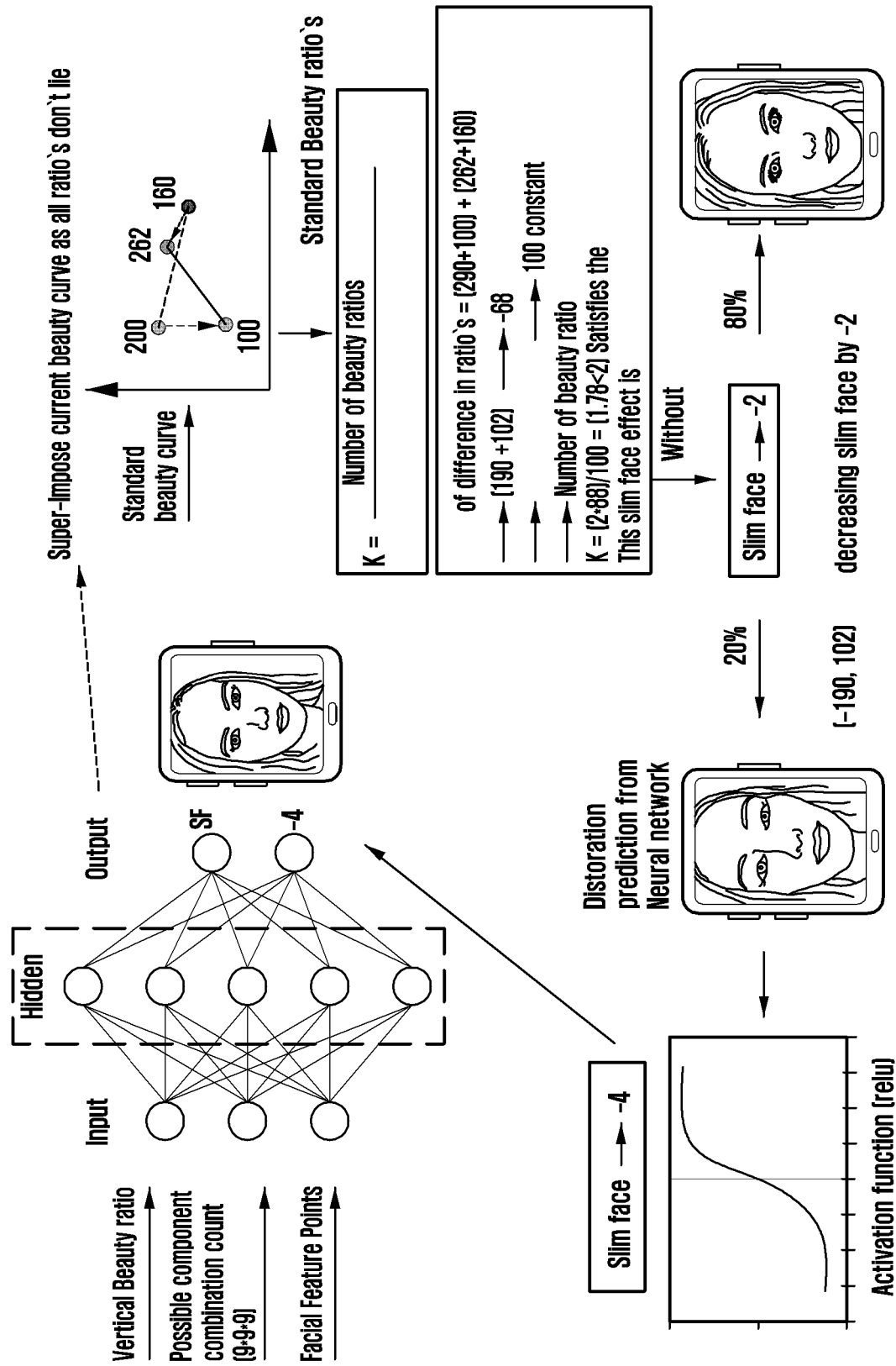
Figure 8G:
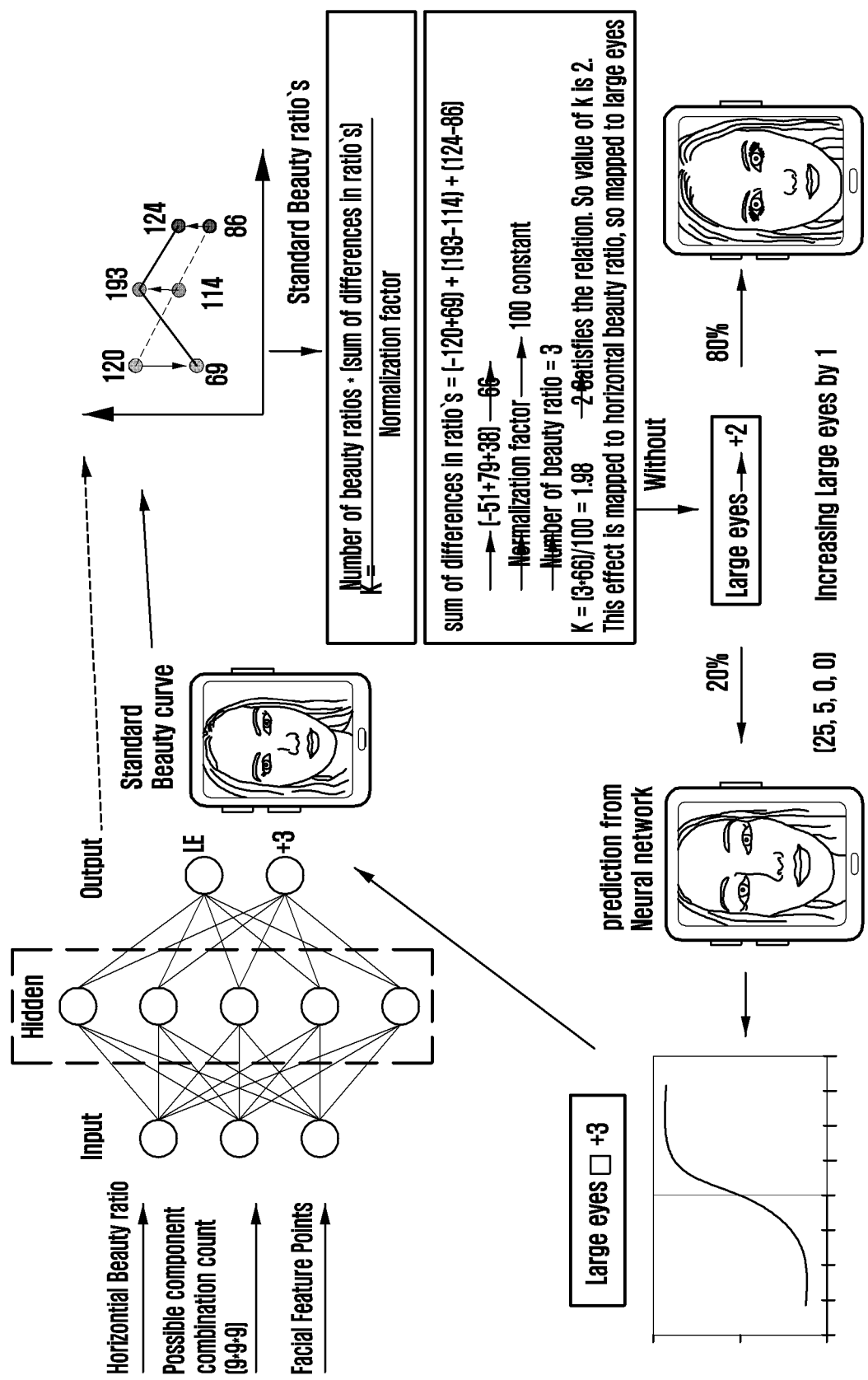

In an example, as shown in FIG. 8F, the electronic device 100 pass 3 components (i.e., beauty ratio, possible component combination count (9*9*9), and facial feature points) to the neural network. Further, the electronic device 100 will be checking the value of beauty ratio's and try to superimpose those values to the standard beauty curve (as explained in FIGS. 8C, 8DA, 8DB, 8EA and 8EB). As the proposed methods utilizes an un-supervised learning (super-imposing), so there will be chance for most of the times the electronic device 100 to obtain the correct image and for less time the electronic device 100 to obtain distortion in the image. In order to avoid the distortion, the electronic device 100 passes the calculated values to the deep learning module to predict the correct beauty effect for the corresponding face and apply that beauty effect. The operations and functions of the beauty effect setting determination for FIG. 8G is similar to FIG. 8F.

Although FIG. 1 shows overview of the electronic device 100 but it is to be understood that other embodiments are not limited thereon. In other embodiments, the electronic device 100 may include less or more number of components. Further, the labels or names of the components are used only for illustrative purpose and does not limit the scope of the disclosure.

Figure 2:
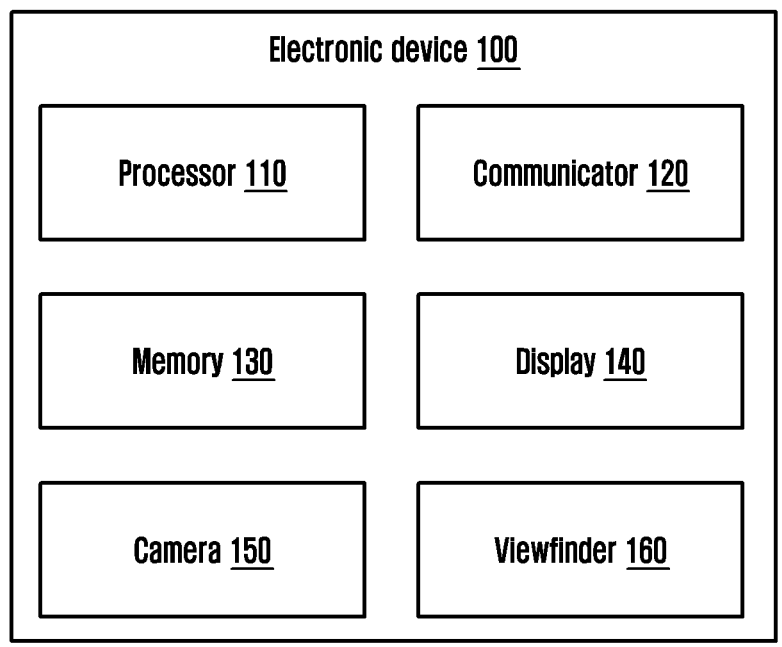
FIG. 2 illustrates various hardware components of an electronic device for applying a beauty effect setting, according to an embodiment of the disclosure.

FIG. 2 illustrates various hardware components of an electronic device 100 for applying a beauty effect setting, according to an embodiment of the disclosure.

Referring to FIG. 2, in an embodiment, the electronic device 100 includes a processor 110, a communicator 120, a memory 130, a display 140, a camera 150 and a viewfinder 160. The processor 110 is coupled with the communicator 120, the memory 130, the display 140, the camera 150 and the viewfinder 160.

The processor 110 is configured to detect user face from the current previewed frame in the viewfinder 160 of the camera 150. Based on the detected user face, the processor 110 is configured to extract the plurality of feature points. Further, the processor 110 is configured to determine at least one the beauty ratio based on the plurality of extracted feature points. The at least one beauty ratio is determined by determining spatial data comprising at least one of the plurality of vertical distances from the plurality of extracted feature points and the plurality of horizontal distances from the plurality of extracted feature points. In an embodiment, the beauty ratio is at least one of the standard beauty ratio, the vertical beauty ratio, and the horizontal beauty ratio.

Further, the processor 110 is configured to superimpose the at least one beauty ratio with the predefined beauty ratio. Further, the processor 110 is configured to map the at least one superimposed beauty ratio to at least one camera beauty effect. Further, the processor 110 is configured to apply the beauty effect setting on the user face based on the at least one mapped camera beauty effect. The display 140 display the user face based on the applied beauty effect setting.

The processor 110 is configured to execute instructions stored in the memory 130 and to perform various processes. The communicator (120) is configured for communicating internally between internal hardware components and with external devices via one or more networks.

The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory. In certain examples, a non-transitory storage medium may store data that can, over time, change (e.g., in Random Access Memory (RAM) or cache).

Referring to FIG. 2, it shows various hardware components of electronic device 100 but it is to be understood that other embodiments are not limited thereon. In other embodiments, the electronic device 100 may include less or more number of components. Further, the labels or names of the components are used only for illustrative purpose and does not limit the scope of the disclosure. One or more components can be combined together to perform same or substantially similar function to apply the beauty effect setting in the electronic device 100.

Figure 3:
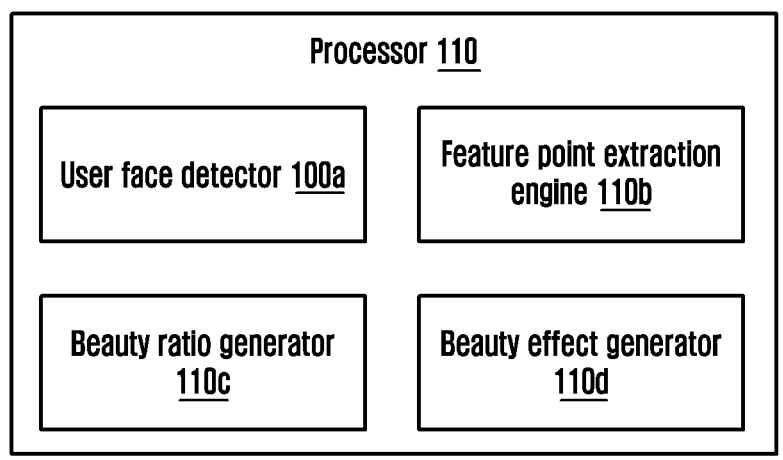
FIG. 3 illustrates various hardware components of a processor, according to an embodiment of the disclosure.

FIG. 3 illustrates various hardware components of a processor, according to an embodiment of the disclosure.

Referring to FIG. 3, the processor 110 includes a user face detector (110a), a feature point extraction engine 110b, a beauty ratio generator 110c and a beauty effect generator (110d). In an embodiment, the user face detector 110a is configured to detect user face from the current previewed frame in the viewfinder 160 of the camera (150). Based on the detected user face, the feature point extraction engine (110b) is configured to extract the plurality of feature points.

Further, the beauty ratio generator 110c is configured to determine at least one beauty ratio based on the plurality of extracted feature points. Further, the beauty ratio generator 110c is configured to superimpose the at least one beauty ratio with the predefined beauty ratio. Further, the beauty ratio generator 110c is configured to map the at least one superimposed beauty ratio to at least one camera beauty effect. Further, the beauty effect generator 110d is configured to apply the beauty effect setting on the user face based on the at least one mapped camera beauty effect.

Although FIG. 3 shows various hardware components of the processor 110, it is to be understood that other embodiments are not limited thereto. In other embodiments, the processor 110 may include less or more components. Further, the labels or names of the components are used only for illustrative purpose and does not limit the scope of the disclosure. One or more components can be combined together to perform same or substantially similar function to apply the beauty effect setting in the electronic device 100.

Figure 4:
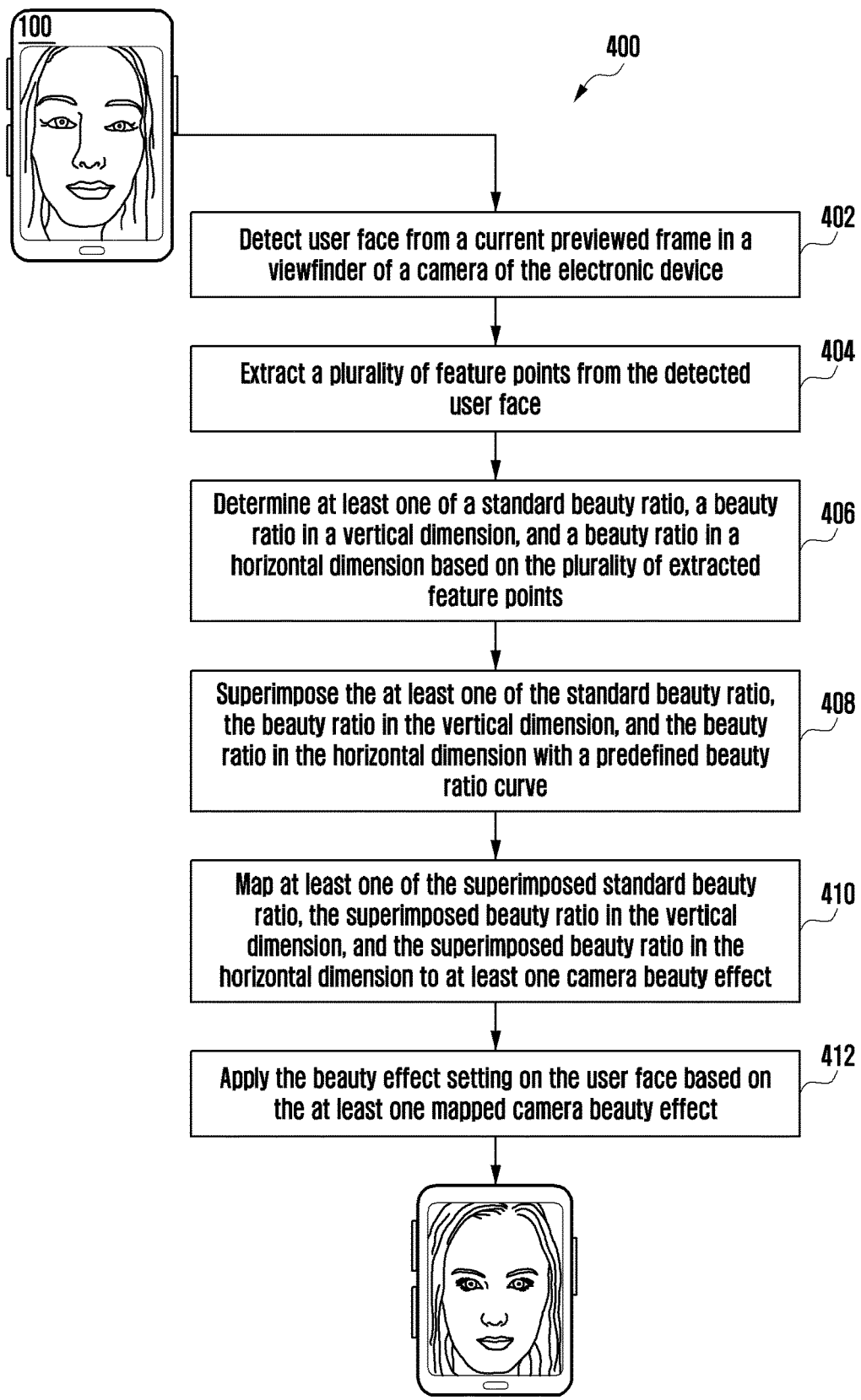
FIG. 4 is a flow chart illustrating a method for applying a beauty effect setting in an electronic device, according to an embodiment of the disclosure.

FIG. 4 is a flow chart illustrating a method for applying a beauty effect setting in an electronic device, according to an embodiment of the disclosure.

Referring to FIG. 4, at 402, the method includes detecting the user face from the current previewed frame in the viewfinder 160 of the camera 150. At 404, the method includes extracting the plurality of feature points from the detected user face. At 406, the method includes determining the at least one beauty ratio based on the plurality of extracted feature points. At 408, the method includes superimposing the at least one beauty ratio with the predefined beauty ratio. At 410, the method includes mapping the at least one superimposed beauty ratio to at least one camera beauty effect. At 412, the method includes applying the beauty effect setting on the user face based on the at least one mapped camera beauty effect.

The various actions, acts, blocks, operations, or the like in the flow method 400 may be performed in the order presented, in a different order or simultaneously. Further, in some embodiments, some of the actions, acts, blocks, operations, or the like may be omitted, added, modified, skipped, or the like without departing from the scope of the disclosure.

Figure 9A:
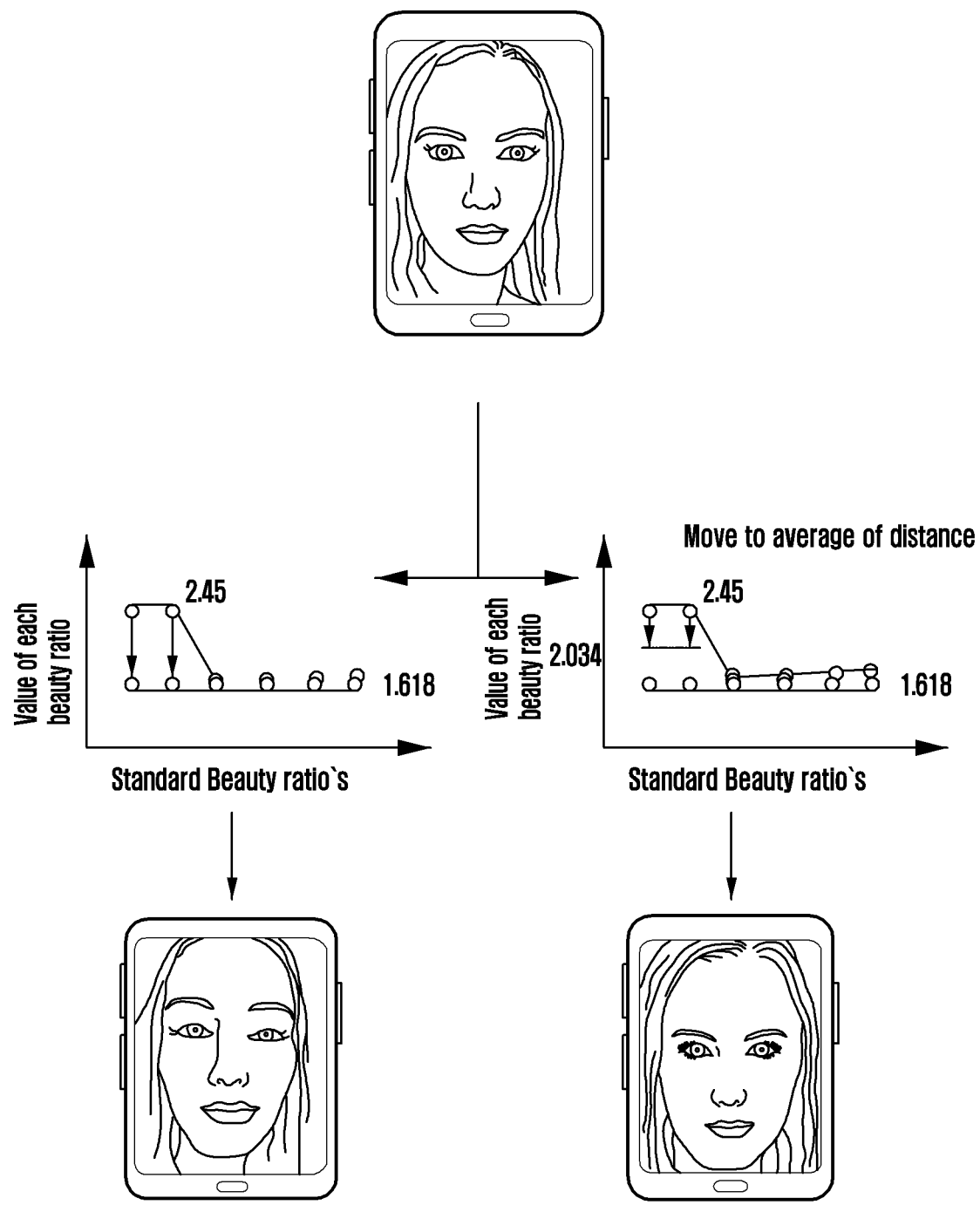
FIGS. 9A and 9B are example scenarios in which a beauty effect prediction is explained, according to various embodiments of the disclosure.
Figure 9B:
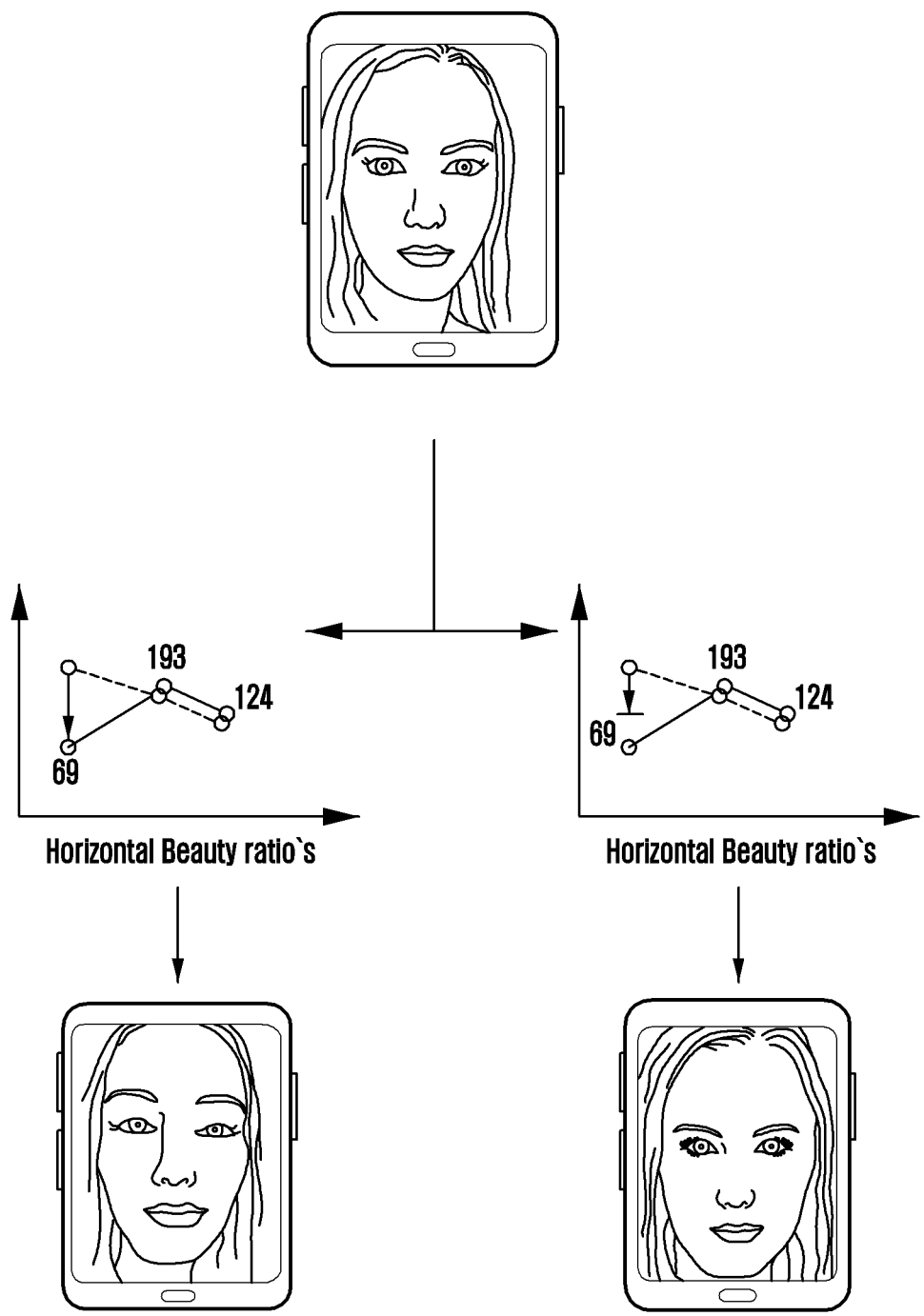

FIGS. 9A and 9B are example scenarios in which a beauty effect prediction is explained, according to various embodiments of the disclosure.

Referring to FIGS. 9A and 9B, if less than ((number of beauty ratio)/2) are not matched from standard curve, then the electronic device 100 map ratio's to average distance, because weights of beauty ratio mapped are high. This is the first try is to impose to half, if not satisfy then neural network will calculate a value. If only few ratio (below example 2) don't lie to a standard curve and if we shift curve to completely then there may be chance of overlap then there may be a situation that face can be distorted as shown in FIG. 9A.

This has to be done at backend and neural network will see whether or not the value has to be increased as shown in FIG. 9B. As shown in FIG. 9B, when more than n/2 beauty components lie on a curve then average superimposition leads to a better effect as distortion and cost function value of neural network can increase, the electronic device 100 took the example where out of 3 beauty ratios 2 lie on the standard curve and 1 does not lie on the curve, so the electronic device prefers to do average moment of the curve to get the best beauty effect.

FIGS. 10A, 10B, 10C, 10D, and 10E are example scenarios in which an electronic device applies a beauty effect setting on a user face based on at least one mapped camera beauty effect, according to various embodiments of the disclosure.

Figure 10A:
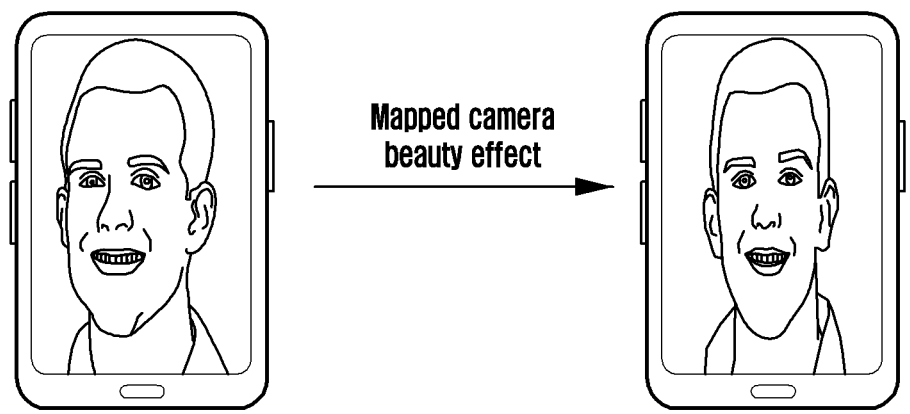

Referring to FIG. 10A, based on the proposed method, the beauty ratio is mapped to shape correction setting mode based on the mapping table (indicated in FIG. 10A). The method can be used to predict value of shape correction effect to make the good look for the user.

Figure 10B:
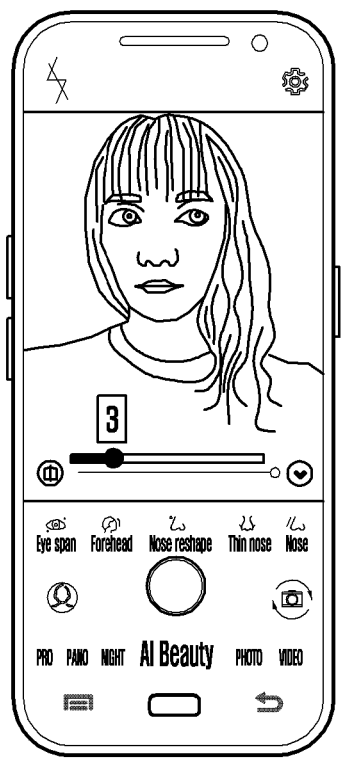
Figure 10B:
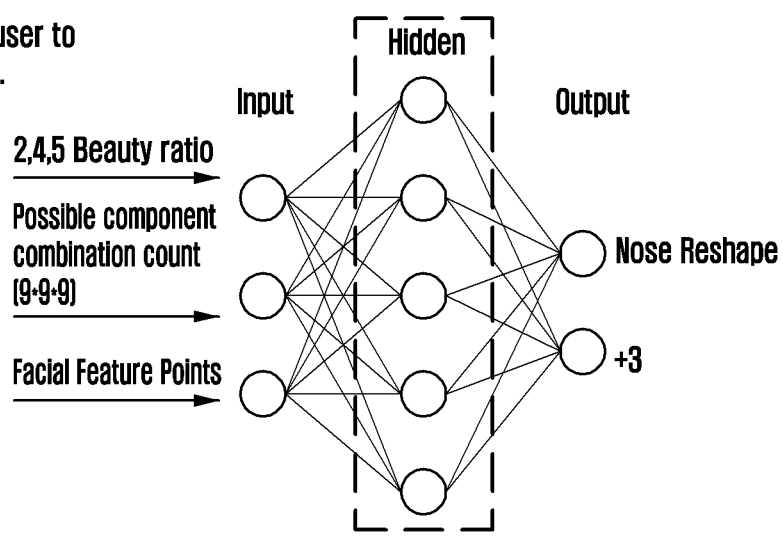

Referring to FIG. 10B, based on the proposed method, the beauty ratio is mapped to a nose reshape setting mode based on the mapping table (indicated in FIG. 10B). The method can be used to predict value of nose reshape effect to make the good look of nose for the user.

Referring to FIG. 10C, based on the proposed method, the standard beauty ratio is mapped to a forehead setting mode based on the mapping table (indicated in FIG. 10C). The method can be used to predict the value of the forehead effect to change automatically resize forehead for the user.

Referring to FIG. 10D, based on the proposed method, the standard beauty ratio is mapped to the jaw setting mode based on the mapping table (indicated in FIG. 10D). The method can be used to predict value of the JAW effect to change automatically size of the Jaw for the user.

Figure 10E:
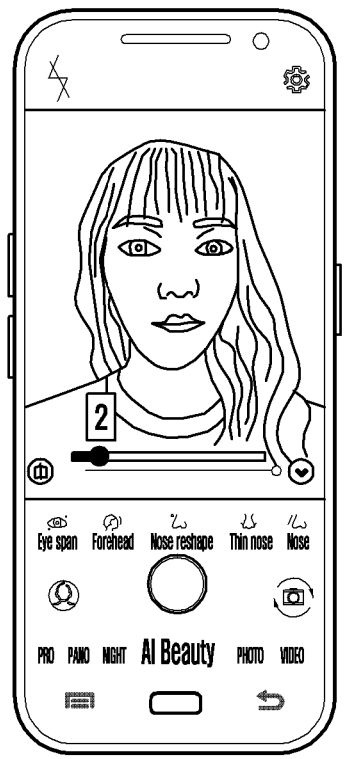
Figure 10E:
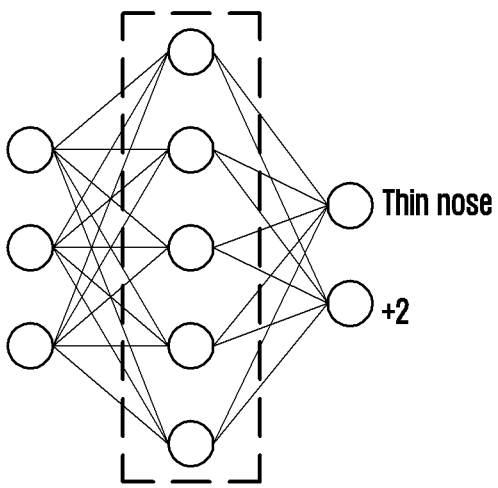

Referring to FIG. 10E, based on the proposed method, the standard beauty ratio is mapped to a thin nose setting mode based on the mapping table (indicated in FIG. 10E). The method can be used to predict value of the thin nose effect to thin nose for the user.

In the disclosure, for the sake of understanding, the method can be explained from perspective of the human face, but the proposed method can be applied to other objects as well. The object can be, for example but not limited to a flower, leaf, an animal, or the like.

The embodiments disclosed herein can be implemented using at least one software program running on at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed:

1. A method for applying a beauty effect setting in an electronic device, the method comprising:
    determining, by the electronic device, at least one beauty ratio associated with a user face;
    determining minimum values associated with the at least one beauty ratio being deflected with values associated with a predefined beauty ratio;
    after the determining, mapping the at least one beauty ratio with the predefined beauty ratio for superimposing the at least one beauty ratio with the predefined beauty ratio, the mapping being based on an average distance of the minimum values associated with the at least one beauty ratio;
    mapping, by the electronic device, the superimposed at least one beauty ratio to at least one camera beauty effect; and
    based on the mapping of the superimposed at least one beauty ratio to the at least one camera beauty effect, applying, by the electronic device, the beauty effect setting on the user face,
    wherein the applying of the beauty effect setting on the user face comprises at least one of increasing or decreasing a facial width of the user face according to a user, increasing or decreasing a distance between eye corners and enlarging eye pupils according to the user, or changing vertical and horizontal facial distances to make a perfect aligned face according to the user.

2. The method of claim 1, wherein the determining of the at least one beauty ratio comprises:
    detecting the user face from a current previewed frame in a viewfinder of a camera of the electronic device;
    extracting a plurality of feature points from the user face; and
    based on the plurality of feature points, determining the at least one beauty ratio.

3. The method of claim 2, wherein the determining of the at least one beauty ratio based on the plurality of feature points comprises:
    determining spatial data comprising at least one of a plurality of vertical distances from the plurality of feature points or a plurality of horizontal distances from the plurality of feature points; and
    based on the spatial data, determining the at least one beauty ratio.

4. The method of claim 1, wherein the at least one beauty ratio comprises at least one of a standard beauty ratio, a vertical beauty ratio, or a horizontal beauty ratio.

5. The method of claim 1, wherein the superimposing of the at least one beauty ratio with the predefined beauty ratio comprises:
    determining that maximum values associated with the at least one beauty ratio are deflecting with the values associated with the predefined beauty ratio; and
    based on the determining, superimposing the at least one beauty ratio with the predefined beauty ratio.

6. The method of claim 1, wherein the superimposing of the at least one beauty ratio with the predefined beauty ratio comprises:
    determining a distortion parameter using a neural network; and
    based on the mapping and the distortion parameter, superimposing the at least one beauty ratio with the predefined beauty ratio.

7. An electronic device for applying a beauty effect setting, the electronic device comprising:
a memory; and
at least one processor coupled with the memory, the at least one processor being configured to:
determine at least one beauty ratio associated with a user face,
determine minimum values associated with the at least one beauty ratio being deflected with values associated with a predefined beauty ratio,
after the determining, map the at least one beauty ratio with the predefined beauty ratio for superimposing the at least one beauty ratio with the predefined beauty ratio, the mapping being based on an average distance of the minimum values associated with the at least one beauty ratio,
map the superimposed at least one beauty ratio to at least one camera beauty effect, and
based on the mapping of the superimposed at least one beauty ratio to the at least one camera beauty effect, apply the beauty effect setting on the user face,
wherein the applying of the beauty effect setting on the user face comprises at least one of increasing or decreasing a facial width of the user face according to a user, increasing or decreasing a distance between eye corners and enlarging eye pupils according to the user, or changing vertical and horizontal facial distances to make a perfect aligned face according to the user.

8. The electronic device of claim 7, wherein the at least one processor is further configured to:
detect the user face from a current previewed frame in a viewfinder of a camera of the electronic device,
extract a plurality of feature points from the detected user face, and
based on the plurality of feature points, determine the at least one beauty ratio.

9. The electronic device of claim 8, wherein the at least one processor is further configured to:
determine spatial data comprising at least one of a plurality of vertical distances from the plurality of feature points or a plurality of horizontal distances from the plurality of feature points, and
based on the spatial data, determine the at least one beauty ratio.

10. The electronic device of claim 7, wherein the at least one beauty ratio comprises at least one of a standard beauty ratio, a vertical beauty ratio, or a horizontal beauty ratio.

11. The electronic device of claim 7, wherein the at least one processor is further configured to:
determine that maximum values associated with the at least one beauty ratio are deflecting with the values associated with the predefined beauty ratio, and
based on the determining, superimpose the at least one beauty ratio with the predefined beauty ratio.

12. The electronic device of claim 7, wherein the at least one processor is further configured to:
determine a distortion parameter using a neural network, and
based on the mapping and the distortion parameter, superimpose the at least one beauty ratio with the predefined beauty ratio.

13. A non-transitory computer readable storage medium storing thereon instructions which, when executed by at least one processor, perform a method for applying a beauty effect setting in an electronic device, the method comprising:
determining at least one beauty ratio associated with a user face;
determining minimum values associated with the at least one beauty ratio being deflected with values associated with a predefined beauty ratio;
after the determining, mapping the at least one beauty ratio with the predefined beauty ratio for superimposing the at least one beauty ratio with the predefined beauty ratio, the mapping being based on an average distance of the minimum values associated with the at least one beauty ratio;
mapping the superimposed at least one beauty ratio to at least one camera beauty effect; and
based on the mapping of the superimposed at least one beauty ratio to the at least one camera beauty effect, applying the beauty effect setting on the user face,
wherein the applying of the beauty effect setting on the user face comprises at least one of increasing or decreasing a facial width of the user face according to a user, increasing or decreasing a distance between eye corners and enlarging eye pupils according to the user, or changing vertical and horizontal facial distances to make a perfect aligned face according to the user.

14. The non-transitory computer readable storage medium of claim 13, wherein the determining of the at least one beauty ratio comprises:
detecting the user face from a current previewed frame in a viewfinder of a camera of the electronic device;
extracting a plurality of feature points from the detected user face; and
determining the at least one beauty ratio based on the plurality of feature points.

15. The non-transitory computer readable storage medium of claim 14, wherein the determining of the at least one beauty ratio further comprises:
determining spatial data comprising at least one of a plurality of vertical distances from the plurality of feature points or a plurality of horizontal distances from the plurality of feature points; and
based on the spatial data, determining the at least one beauty ratio.

16. The non-transitory computer readable storage medium of claim 13, wherein the applying of the beauty effect setting on the user face further comprises:
increasing or decreasing the facial width of the user;
increasing or decreasing the distance between the eye corners and enlarging the eye pupils; and
changing facial distances vertically and horizontally to make the user face increasingly symmetrical.

17. The non-transitory computer readable storage medium of claim 16, wherein the increasing or decreasing of the distance between the eye corners and the enlarging of the eye pupils is determined by comparing the distance between the eye corners and a size of the eye pupils to an average distance between the eye corners and an average size of the eye pupils of the predefined beauty ratio.

18. The non-transitory computer readable storage medium of claim 13, wherein the superimposing of the at least one beauty ratio with the predefined beauty ratio comprises applying a plurality of beauty ratios across a standard beauty curve.

* * * * *